(12) United States Patent
Kawamura

(10) Patent No.: US 11,649,740 B2
(45) Date of Patent: May 16, 2023

(54) HYDRAULIC OIL CONTROL VALVE AND VALVE TIMING ADJUSTMENT DEVICE

(71) Applicant: DENSO CORPORATION, Kariya (JP)

(72) Inventor: Futoshi Kawamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/483,437

(22) Filed: Sep. 23, 2021

(65) Prior Publication Data

US 2022/0010695 A1 Jan. 13, 2022

Related U.S. Application Data

(63) Continuation of application No. PCT/JP2020/012846, filed on Mar. 24, 2020.

(30) Foreign Application Priority Data

Mar. 25, 2019 (JP) .............................. JP2019-055904

(51) Int. Cl.
*F01L 1/344* (2006.01)
*F16K 11/07* (2006.01)

(52) U.S. Cl.
CPC ........ *F01L 1/3442* (2013.01); *F16K 11/0716* (2013.01); *F01L 2001/3443* (2013.01); *F01L 2001/3444* (2013.01)

(58) Field of Classification Search
CPC ......... F01L 1/3442; F01L 1/022; F01L 1/053; F01L 1/46; F01L 2001/3443;

(Continued)

(56) References Cited

U.S. PATENT DOCUMENTS

2007/0273223 A1 11/2007 Ward et al.
2011/0303169 A1* 12/2011 Nakamura ............ F01L 1/3442
251/304

(Continued)

FOREIGN PATENT DOCUMENTS

JP 2020-159201 10/2020
JP 2020-159203 10/2020

(Continued)

OTHER PUBLICATIONS

U.S. Appl. No. 17/483,239, to Kawamura, entitled "Hydraulic Oil Control Valve and Valve Timing Adjustment Device", filed Sep. 23, 2021 (41 pages).

(Continued)

*Primary Examiner* — Devon C Kramer
*Assistant Examiner* — Wesley G Harris
(74) *Attorney, Agent, or Firm* — Nixon & Vanderhye P.C.

(57) ABSTRACT

A hydraulic oil control valve is coaxially disposed with a rotational axial of a valve timing adjustment device. The hydraulic oil control valve includes a sleeve, a spool slidably moving in an axial direction within the sleeve, and a filter member configured to capture foreign matters contained in the hydraulic oil. The sleeve includes an inner sleeve and an outer sleeve defining therein an axial hole extending in the axial direction. A space between the axial hole and the inner sleeve in a radial direction serves as a hydraulic oil supply passage. The filter member is disposed in the space to overlap with at least one of internal members in the inner sleeve when viewed in the radial direction.

13 Claims, 12 Drawing Sheets

(58) Field of Classification Search
CPC ....... F01L 2001/344; F01L 2001/34456; F01L 2001/34479; F01L 2001/34469; F01L 2301/00; F01L 2001/3444; F16K 11/0704; F16K 11/0716; F16K 27/041; F16K 31/0613

See application file for complete search history.

(56) References Cited

U.S. PATENT DOCUMENTS

| | | |
|---|---|---|
| 2015/0300212 A1 | 10/2015 | Bayrakdar |
| 2016/0010516 A1 | 1/2016 | Suzuki et al. |
| 2017/0022854 A1 | 1/2017 | Takada |
| 2019/0323388 A1 | 10/2019 | Mitsutani |
| 2019/0323392 A1 | 10/2019 | Mitsutani |
| 2019/0368387 A1 | 12/2019 | Mitsutani |

FOREIGN PATENT DOCUMENTS

| | | |
|---|---|---|
| JP | 2020-159204 | 10/2020 |
| WO | 2020/196403 | 10/2020 |
| WO | 2020/196404 | 10/2020 |
| WO | 2020/196418 | 10/2020 |
| WO | 2020/196454 | 10/2020 |
| WO | 2020/196456 | 10/2020 |

OTHER PUBLICATIONS

U.S. Appl. No. 17/483,371, to Kawamura, entitled "Hydraulic Oil Control Valve and Valve Timing Adjustment Device", filed Sep. 23, 2021 (33 pages).

U.S. Appl. No. 17/483,499, to Kawamura, entitled "Hydraulic Oil Control Valve and Valve Timing Adjustment Device", filed Sep. 23, 2021 (42 pages).

U.S. Appl. No. 17/483,540, to Kawamura, entitled "Hydraulic Oil Control Valve and Valve Timing Adjustment Device", filed Sep. 23, 2021 (53 pages).

U.S. Appl. No. 17/483,605, to Kawamura, entitled "Valve Timing Adjustment Device", filed Sep. 23, 2021 (34 pages).

\* cited by examiner

HYDRAULIC OIL CONTROL VALVE AND VALVE TIMING ADJUSTMENT DEVICE

CROSS REFERENCE TO RELATED APPLICATION

The present application is a continuation application of International Patent Application No. PCT/JP2020/012846 filed on Mar. 24, 2020, which designated the U.S. and claims the benefit of priority from Japanese Patent Application No. 2019-055904 filed on Mar. 25, 2019. The entire disclosures of all of the above applications are incorporated herein by reference.

TECHNICAL FIELD

The present disclosure relates to a hydraulic oil control valve used for a valve timing adjustment device.

BACKGROUND

A hydraulic valve timing adjustment device that is capable of adjusting a valve timing of an intake valve or an exhaust valve of an internal combustion engine has been known. In the hydraulic valve timing adjustment device, a supply of a hydraulic oil into hydraulic chambers defined by a vane rotor in a housing and a discharge of the hydraulic oil from the hydraulic chambers may be achieved by a hydraulic oil control valve disposed in a center portion of the vane rotor. For example, a hydraulic oil control valve has a double-structure tubular sleeve including an outer sleeve and an inner sleeve and a space between the outer sleeve and the inner sleeve in a radial direction serves as a hydraulic oil supply passage.

SUMMARY

A hydraulic oil control valve is used for a valve timing adjustment device that is configured to adjust valve timing of a valve and that is fixed to an end portion of one shaft that is a drive shaft or a driven shaft. The driven shaft is configured to selectively open and close a valve with a driving force transmitted from the drive shaft. The hydraulic oil control valve is coaxially disposed with a rotational axis of the valve timing adjustment device and configured to control a flow of the hydraulic oil supplied from a hydraulic oil supply source. The hydraulic oil control valve includes a tubular sleeve, a spool, and a filter member. The spool has an end portion in contact with an actuator and is slidably moved by the actuator in an axial direction within the sleeve. The filter member is configured to capture foreign matters contained in the hydraulic oil. The sleeve includes an inner sleeve and an outer sleeve. The inner sleeve is disposed radially outside of the spool and internal members are disposed in the inner sleeve. The outer sleeve defines therein an axial hole extending in the axial direction and the inner sleeve is inserted into the axial hole. The outer sleeve is configured to be fixable to the end portion of the one shaft by an axial force applied to the outer sleeve in the axial direction. A space between the axial hole and the inner sleeve in a radial direction serves as a hydraulic oil supply passage. Fluid communication between the hydraulic oil supply passage and the hydraulic oil supply source is established when the outer sleeve is fixed to the end portion of the one shaft. The filter member is disposed in the space to overlap with at least one of the internal members when viewed in the radial direction.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
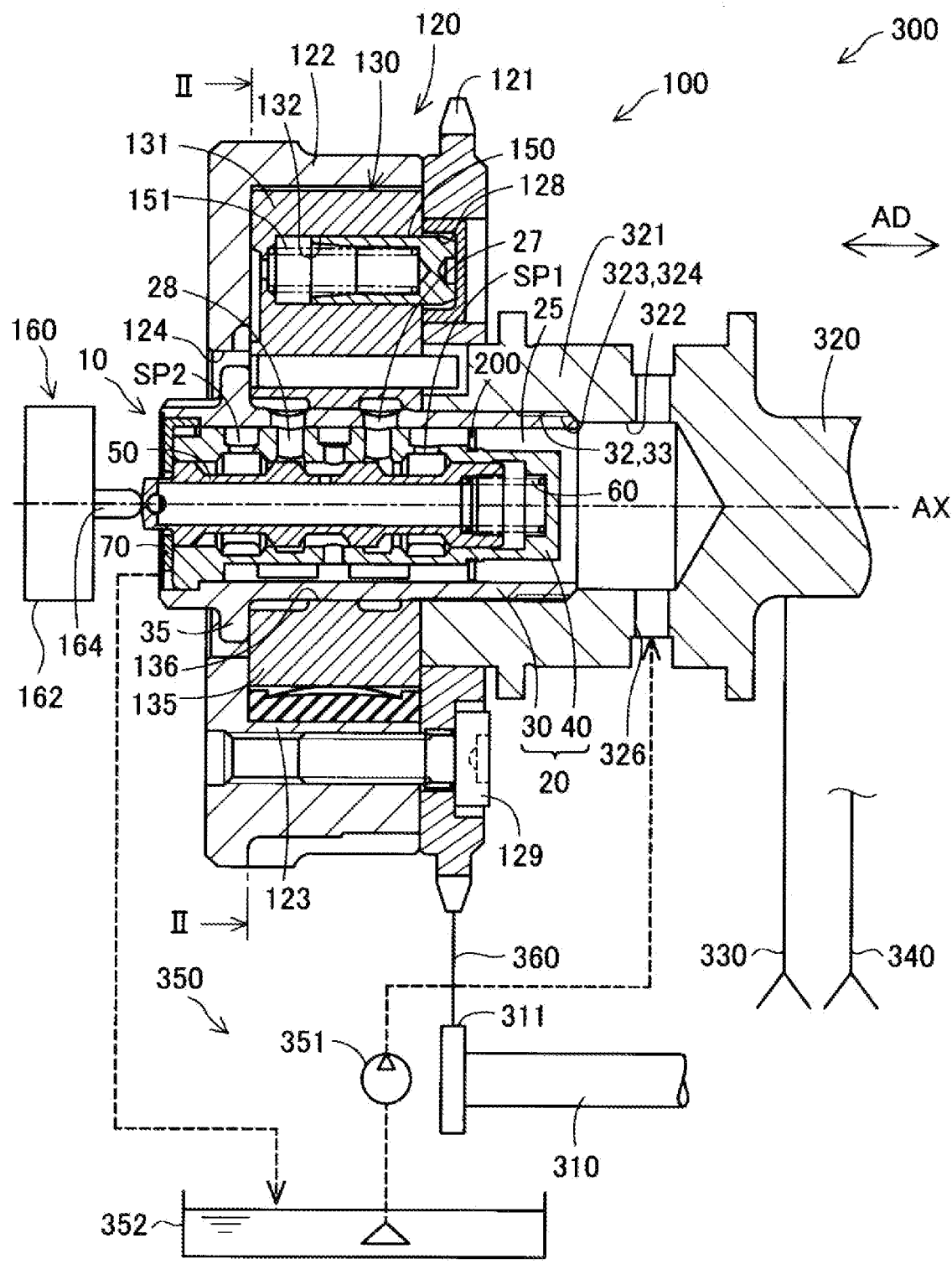
FIG. 1 is a cross-sectional view showing a schematic configuration of a valve timing adjustment device including a hydraulic oil control valve.

To begin with, examples of relevant techniques will be described.

A hydraulic valve timing adjustment device that is capable of adjusting a valve timing of an intake valve or an exhaust valve of an internal combustion engine has been known. In the hydraulic valve timing adjustment device, a supply of a hydraulic oil into hydraulic chambers defined by a vane rotor in a housing and a discharge of the hydraulic oil from the hydraulic chambers may be achieved by a hydraulic oil control valve disposed in a center portion of the vane rotor. For example, a hydraulic oil control valve has a double-structure tubular sleeve including an outer sleeve and an inner sleeve. The outer sleeve is fastened to an end portion of a camshaft and a spool is moved within the inner sleeve, so that an oil channel is switched. In the hydraulic oil control valve, a space between the outer sleeve and the inner sleeve in a radial direction serves as a hydraulic oil supply passage.

In the hydraulic oil control valve, a filter member for capturing foreign matters contained in the hydraulic oil is arranged in an end portion of the inner sleeve facing the camshaft. Therefore, a dimension of the inner sleeve along the axial direction may be increased in order to arrange the filter member. Due to such an increase in the dimension, a dimension of the outer sleeve along the axial direction may increase and degree of freedom in designing the hydraulic oil control valve may decrease. Therefore, a technique for suppressing an increase in the dimension of the inner sleeve in the axial direction is needed.

The present disclosure can be realized as the following embodiments.

According to one embodiment of the present disclosure, a hydraulic oil control valve is provided. This hydraulic oil control valve is used for a valve timing adjustment device that is configured to adjust valve timing of a valve and that is fixed to an end portion of one shaft that is a drive shaft or a driven shaft. The driven shaft is configured to selectively open and close a valve with a driving force transmitted from the drive shaft. The hydraulic oil control valve is coaxially disposed with a rotational axis of the valve timing adjustment device and configured to control a flow of the hydraulic oil supplied from a hydraulic oil supply source. The hydraulic oil control valve includes a tubular sleeve, a spool, and a filter member. The spool has an end portion in contact with an actuator and is slidably moved by the actuator in an axial direction within the sleeve. The filter member is configured to capture foreign matters contained in the hydraulic oil. The sleeve includes an inner sleeve and an outer sleeve. The inner sleeve is disposed radially outside of the spool and internal members are disposed in the inner sleeve. The outer sleeve defines therein an axial hole extending in the axial direction and the inner sleeve is inserted into the axial hole. The outer sleeve is configured to be fixable to the end portion of the one shaft by an axial force applied to the outer sleeve in the axial direction. A space between the axial hole and the inner sleeve in a radial direction serves as a hydraulic oil supply passage. Fluid communication between the hydraulic oil supply passage and the hydraulic oil supply source is established when the outer sleeve is fixed to the end portion of the one shaft. The filter member is disposed in the space to overlap with at least one of the internal members when viewed in the radial direction.

According to this hydraulic oil control valve, the filter member is disposed in the space between the inner sleeve and the axial hole serving as the hydraulic oil supply passage in the radial direction to overlap with at least one of the internal members disposed in the inner sleeve when viewed in the radial direction. Thus, it is possible to restrict a dimension in the axial direction of the inner sleeve from increasing to dispose the filter member.

The present disclosure can be realized as the following embodiments. For example, it can be realized in a method for manufacturing a hydraulic oil control valve, a valve timing adjustment device provided with a hydraulic oil control valve, a method for manufacturing the valve timing adjustment device, and the like.

A. First Embodiment

A-1. Device Configuration:

A valve timing adjustment device 100 shown in FIG. 1 is used for an internal combustion engine 300 of a vehicle (not shown) and configured to adjust a valve timing of a valve that is opened or closed by a camshaft 320 to which a driving force is transmitted from a crankshaft 310. The valve timing adjustment device 100 is provided in a power transmission path from the crankshaft 310 to the camshaft 320. More specifically, the valve timing adjustment device 100 is fixed to an end portion 321 of the camshaft 320 in a direction along a rotational axis AX of the camshaft 320 (hereinafter, referred to as "an axial direction AD"). The valve timing adjustment device 100 has a rotational axis AX that is coaxial with the rotational axis AX of the camshaft 320. The valve timing adjustment device 100 of the present embodiment is configured to adjust valve timing of an intake valve 330 among the intake valve 330 and an exhaust valve 340.

The end portion 321 of the camshaft 320 defines a shaft hole portion 322 and a supply inlet 326. The shaft hole portion 322 extends in the axial direction AD. The shaft hole portion 322 has a shaft fixing portion 323 on an inner circumferential surface of the shaft hole portion 322 to fix a hydraulic oil control valve 10 which will be described later. The shaft fixing portion 323 has a female thread portion 324. The female thread portion 324 is screwed with a male thread portion 33 formed in a valve fixing portion 32 of the hydraulic oil control valve 10. The supply inlet 326 extends in a radial direction and passes through the camshaft 320 between an outer circumferential surface of the camshaft 320 and the shaft hole portion 322. Hydraulic oil is supplied to the supply inlet 326 from a hydraulic oil supply source 350. The hydraulic oil supply source 350 includes an oil pump 351 and an oil pan 352. The oil pump 351 pumps the hydraulic oil stored in the oil pan 352.

Figure 2:
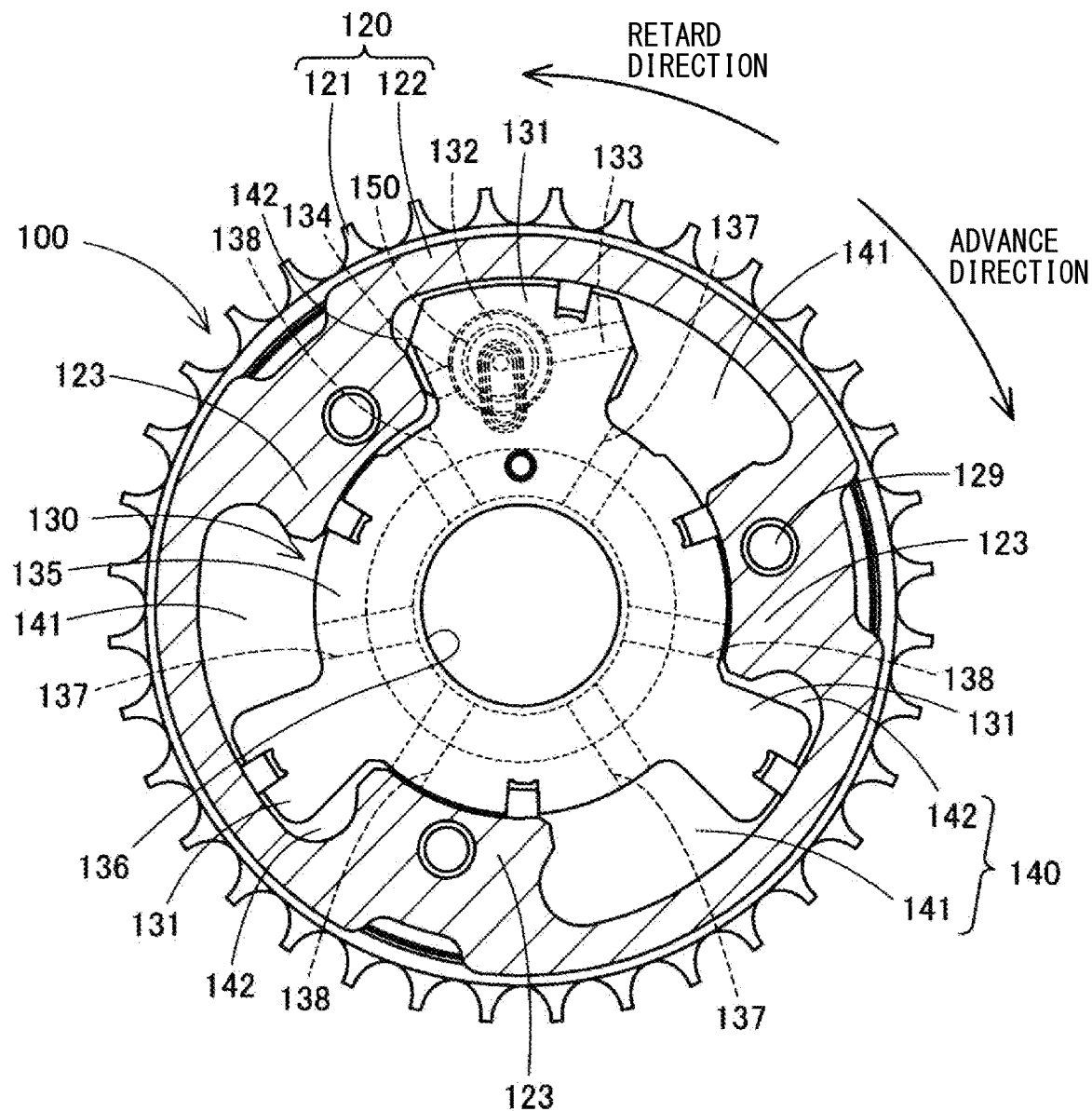
FIG. 2 is a cross-sectional view taken along a line II-II in FIG. 1.

As shown in FIGS. 1 and 2, the valve timing adjustment device 100 includes a housing 120, a vane rotor 130, and the hydraulic oil control valve 10. In FIG. 2, illustrations of the hydraulic oil control valve 10 are omitted.

As shown in FIG. 1, the housing 120 includes a sprocket 121 and a case 122. The sprocket 121 is fit to the end portion 321 of the camshaft 320 and is rotatably supported. The sprocket 121 defines a fitting recessed portion 128 at a position corresponding to a lock pin 150 which will be described later. An annular timing chain 360 is disposed around the sprocket 121 and a sprocket 311 of the crankshaft 310. The sprocket 121 is fixed to the case 122 with multiple bolts 129. Thus, the housing 120 rotates together with the crankshaft 310. The case 122 has a bottomed tubular shape and an opening end of the case 122 is closed by the sprocket 121. As shown in FIG. 2, the case 122 includes multiple partition walls 123 that protrude radially inward and are arranged in a circumferential direction. Spaces defined between adjacent ones of the partition walls 123 in the circumferential direction serve as hydraulic chambers 140. As shown in FIG. 1, the case 122 defines an opening 124 at a center of a bottom portion of the case 122.

The vane rotor 130 is housed inside the housing 120 and configured to rotate in a retard direction or in an advance direction relative to the housing 120 in accordance with a hydraulic pressure of the hydraulic oil supplied from the hydraulic oil control valve 10 which will be described later. Therefore, the vane rotor 130 serves as a phase shifting portion configured to shift a phase of a driven shaft relative to a drive shaft. The vane rotor 130 includes multiple vanes 131 and a boss 135.

As shown in FIG. 2, the multiple vanes 131 protrude radially outward from the boss 135 that is located at a center of the vane rotor 130 and are arranged adjacent to each other in the circumferential direction. The vanes 131 are housed respectively in the hydraulic chambers 140 and divide the hydraulic chambers 140 in the circumferential direction into retard chambers 141 and advance chambers 142. Each of the retard chambers 141 is located on one side of the vane 131 in the circumferential direction. Each of the advance chambers 142 is located on the other side of the vane 131 in the circumferential direction. One of the multiple vanes 131 defines a housing hole 132 extending in the axial direction. The housing hole 132 is in communication with the retard chamber 141 through a retard chamber pin control oil channel 133 defined in the vane 131 and in communication with the advance chamber 142 through an advance chamber pin control oil channel 134. The lock pin 150 is housed in the housing hole 132 such that the lock pin 150 can reciprocate in the axial direction AD in the housing hole 132. The lock pin 150 is configured to restrict the vane rotor 130 from rotating relative to the housing 120 and restrict the vane rotor 130 from coming into contact with the housing 120 in the circumferential direction when the hydraulic pressure is insufficient. The lock pin 150 is biased in the axial direction AD toward the fitting recessed portion 128 formed in the sprocket 121 by a spring 151.

The boss 135 has a tubular shape and is fixed to the end portion 321 of the camshaft 320. Therefore, the vane rotor 130 having the boss 135 is fixed to the end portion 321 of the camshaft 320 and rotates together with the camshaft 320 in an integral manner. The boss 135 defines a through hole 136 passing through the boss 135 in the axial direction at a center of the boss 135. The hydraulic oil control valve 10 is arranged in the through hole 136. The boss 135 defines multiple retard channels 137 and multiple advance channels 138. The retard channels 137 and the advance channels 138 pass through the boss 135 in the radial direction. The retard channels 137 and the advance channels 138 are arranged in the axial direction AD. The retard channels 137 fluidly connect between the retard chambers 141 and retard ports 27 of the hydraulic oil control valve 10 which will be described later. The advance channels 138 fluidly connect between the advance chambers 142 and advance ports 28 of the hydraulic oil control valve 10 which will be described later. In the through hole 136, gaps between the retard channels 137 and the advance channels 138 are sealed by an outer sleeve 30 of the hydraulic oil control valve 10 which will be described later.

In the present embodiment, the housing 120 and the vane rotor 130 are made of an aluminum alloy, but a material of the housing 120 and the vane rotor 130 is not limited to the aluminum alloy and may be any metal material such as iron or stainless steel, a resin material, or the like.

As shown in FIG. 1, the hydraulic oil control valve 10 is used for the valve timing adjustment device 100 and coaxially arranged with the rotational axis AX of the valve timing adjustment device 100. The hydraulic oil control valve 10 is configured to control a flow of the hydraulic oil supplied from the hydraulic oil supply source 350. The operation of the hydraulic oil control valve 10 is controlled by an ECU (not shown) that controls an overall operation of the internal combustion engine 300. The hydraulic oil control valve 10 is driven by a solenoid 160 arranged on a side of the hydraulic oil control valve 10 opposite to the camshaft 320 in the axial direction AD. The solenoid 160 has an electromagnetic portion 162 and a shaft 164. The solenoid 160 moves the shaft 164 in the axial direction AD when the electromagnetic portion 162 is energized by instructions from the ECU. Thereby, the shaft 164 presses a spool 50 of the hydraulic oil control valve 10, which will be described later, toward the camshaft 320 against a biasing force of a spring 60. In the following description, a side of the hydraulic oil control valve opposite to the solenoid 160 in the axial direction AD is referred to as a side closer to the camshaft 320 for descriptive purpose. As will be described later, the spool 50 slides in the axial direction AD by being pressed, so that oil channels can be switched between oil channels in communication with the retard chambers 141 and oil channels in communication with the advance chambers 142.

Figure 3:
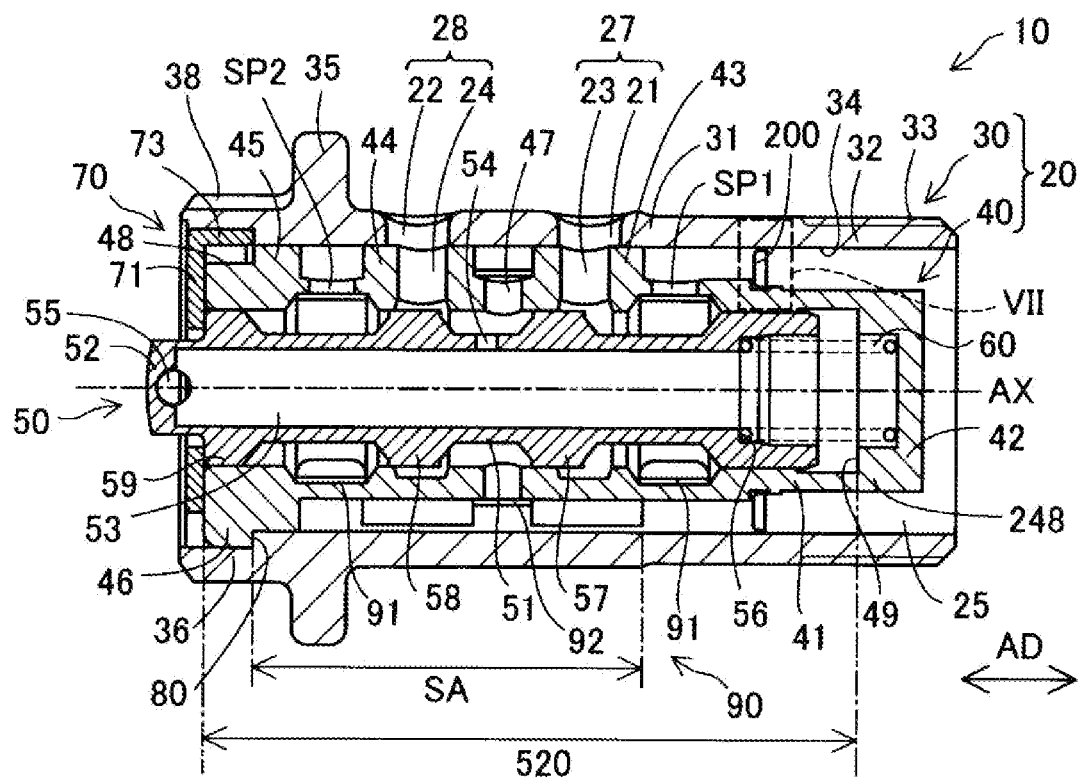
FIG. 3 is a cross-sectional view showing a detailed configuration of a hydraulic oil control valve.
Figure 4:
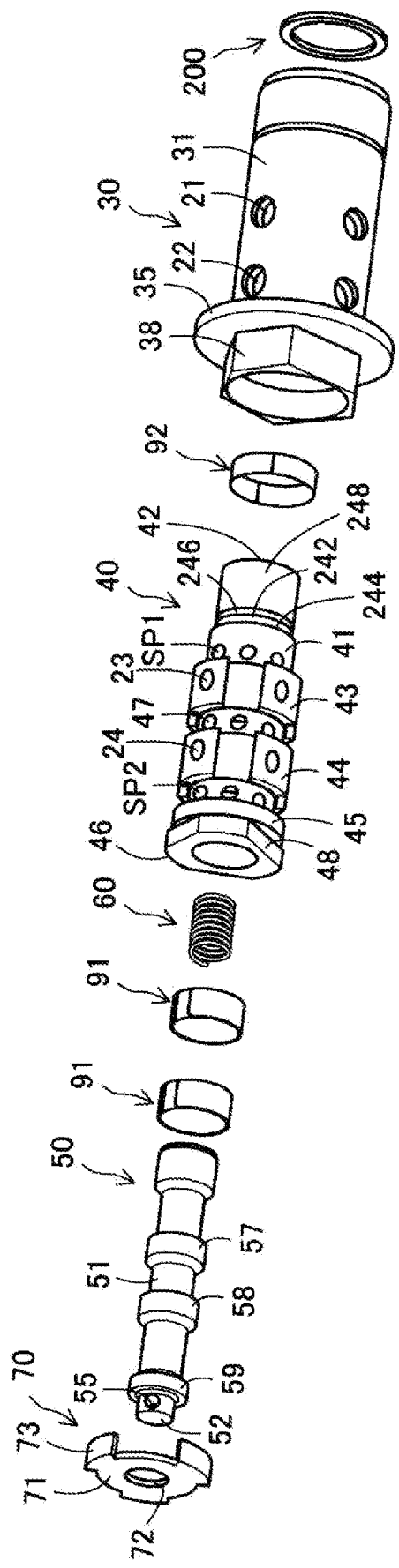
FIG. 4 is an exploded perspective view showing a detailed configuration of the hydraulic oil control valve.

As shown in FIGS. 3 and 4, the hydraulic oil control valve 10 includes a sleeve 20, the spool 50, the spring 60, a fixing member 70, a check valve 90, and a filter member 200. FIG. 3 is a cross-sectional view taken along the rotational axis AX.

The sleeve 20 includes the outer sleeve 30 and an inner sleeve 40. Each of the outer sleeve 30 and the inner sleeve 40 substantially has a tubular shape. The sleeve 20 has a schematic configuration in which the inner sleeve 40 is inserted into an axial hole 34 defined in the outer sleeve 30.

The outer sleeve 30 forms an outer contour of the hydraulic oil control valve 10 and is disposed radially outside of the inner sleeve 40. The outer sleeve 30 has a main body 31, a valve fixing portion 32, a protrusion 35, a large diameter portion 36, a movement restricting portion 80, and a tool engaging portion 38. The main body 31 and the valve fixing portion 32 define the axial hole 34 extending in the axial direction AD. The axial hole 34 passes through the outer sleeve 30 in the axial direction AD.

The main body 31 has a tubular appearance and is arranged in the through hole 136 of the vane rotor 130 as shown in FIG. 1. As shown in FIG. 4, the main body 31 defines multiple outer retard ports 21 and multiple outer advance ports 22. The multiple outer retard ports 21 are arranged adjacent to each other in the circumferential direction and pass through the main body 31 between an outer circumferential surface of the main body 31 and the axial hole 34. The multiple outer advance ports 22 are defined between the outer retard ports 21 and the solenoid 160 in the axial direction AD. The multiple outer advance ports 22 are arranged adjacent to each other in the circumferential direction and pass through the main body 31 between the outer circumferential surface of the main body 31 and the axial hole 34.

The valve fixing portion 32 has a tubular shape and is connected to the main body 31 in the axial direction AD. The valve fixing portion 32 has a diameter substantially the same as that of the main body 31 and is inserted into the shaft fixing portion 323 of the camshaft 320 as shown in FIG. 1. The valve fixing portion 32 has the male thread portion 33. The male thread portion 33 is screwed with the female thread portion 324 of the shaft fixing portion 323. The male thread portion 33 and the female thread portion 324 are fastened to each other, so that an axial force in the axial direction AD toward the camshaft 320 is applied to the outer sleeve 30 and the outer sleeve 30 is fixed to the end portion 321 of the camshaft 320. With the axial force, it is possible to prevent the hydraulic oil control valve 10 from being displaced from the end portion 321 of the camshaft 320 due to an eccentric force generated when the camshaft 320 pushes the intake valve 330. Thus, it is possible to restrict the hydraulic oil from leaking.

The protrusion 35 protrudes radially outward from the main body 31. As shown in FIG. 1, the protrusion 35 holds the vane rotor 130 between the protrusion 35 and the end portion 321 of the camshaft 320 in the axial direction AD.

As shown in FIG. 3, the large diameter portion 36 is formed in an end portion of the main body 31 closer to the solenoid 160. The large diameter portion 36 has an inner diameter that is larger than that of other portions of the main body 31. In the large diameter portion 36, a flange portion 46 of the inner sleeve 40, which will be described later, is arranged.

The movement restricting portion 80 is configured as a stepped portion in the radial direction on the inner circumferential surface of the outer sleeve 30, which is formed by the large diameter portion 36. The movement restricting portion 80 holds the flange portion 46 of the inner sleeve 40, which will be described later, between the movement restricting portion 80 and the fixing member 70 in the axial direction AD. As a result, the movement restricting portion 80 restricts the inner sleeve 40 from moving in a direction away from the electromagnetic portion 162 of the solenoid 160 in the axial direction AD, i.e., toward the camshaft 320.

The tool engaging portion 38 is formed between the protrusion 35 and the solenoid 160 in the axial direction AD. The tool engaging portion 38 is configured to be engaged with a tool such as a hexagon socket (not shown), and is used for fastening and fixing the hydraulic oil control valve 10 including the outer sleeve 30 to the end portion 321 of the camshaft 320.

The inner sleeve 40 has a tubular portion 41, a bottom portion 42, multiple retard protruding walls 43, multiple advance protruding walls 44, a sealing wall 45, the flange portion 46, a stopper 49, a filter fixing portion 242, a supporting portion 244, and a filter stopper 246. The filter fixing portion 242, the supporting portion 244, and the filter stopper 246 will be described later.

The tubular portion 41 substantially has a tubular shape and is located radially inside of the outer sleeve 30 between the main body 31 and the valve fixing portion 32. As shown in FIGS. 3 and 4, the tubular portion 41 defines retard supply ports SP1, advance supply ports SP2, and recycling ports 47. The retard supply ports SP1 are defined between the retard protruding walls 43 and the bottom portion 42 in the axial direction AD and pass through the tubular portion 41 between an outer circumferential surface and an inner circumferential surface of the tubular portion 41. In the present embodiment, the multiple retard supply ports SP1 are arranged in the circumferential direction on a half circumference of the tubular portion 41. However, the multiple retard supply ports SP1 may be arranged on an all circumference of the tubular portion 41 or the tubular portion 41 may have a single retard supply port SP1. The advance supply ports SP2 are defined between the advance protruding walls 44 and the solenoid 160 in the axial direction AD and pass through the tubular portion 41 between the outer circumferential surface and the inner circumferential surface of the tubular portion 41. In the present embodiment, the multiple advance supply ports SP2 are arranged in the circumferential direction on a half circumference of the tubular portion 41. However, the multiple advance supply ports SP1 may be arranged on an all circumference of the tubular portion 41 or the tubular portion 41 may have a single advance supply port SP2. The retard supply ports SP1 and the advance supply ports SP2 are in communication with the shaft hole portion 322 of the camshaft 320 shown in FIG. 1. As shown in FIGS. 3 and 4, the recycling ports 47 are defined between the retard protruding walls 43 and the advance protruding walls 44 in the axial direction AD and pass through the tubular portion 41 between the outer circumferential surface and the inner circumferential surface of the tubular portion 41. The recycling ports 47 are in communication with the retard supply ports SP1 and the advance supply ports SP2. Specifically, the recycling ports 47 are in communication with the retard supply ports SP1 through spaces that are defined between the inner circumferential surface of the main body 31 of the outer sleeve 30 and the outer circumferential surface of the tubular portion 41 of the inner sleeve 40 and that are defined between adjacent ones of the retard protruding walls 43 in the circumferential direction. The recycling ports 47 are in communication with the advance supply ports SP2 through spaces that are defined between the inner circumferential surface of the main body 31 of the outer sleeve 30 and the outer circumferential surface of the tubular portion 41 of the inner sleeve 40 and that are defined between adjacent ones of the advance protruding walls 44 in the circumferential direction. Therefore, the recycling ports 47 serve as a recycling mechanism for returning the hydraulic oil discharged from the retard chambers 141 or the advance chambers 142 to the supply source. In the present embodiment, multiple recycling ports 47 are formed adjacent to each other in the circumferential direction, but the tubular portion 41 may have a single recycling port 47. An operation of the valve timing adjustment device 100 including a switching of the oil channels by sliding the spool 50 will be described later.

As shown in FIG. 3, the bottom portion 42 is integrally formed with the tubular portion 41 and closes an inner sleeve end portion 248 of the tubular portion 41 away from the solenoid 160 in the axial direction AD. One end of the spring 60 is in contact with the bottom portion 42.

As shown in FIG. 4, the multiple retard protruding walls 43 protrude radially outward from the tubular portion 41 and are arranged adjacent to each other in the circumferential direction. The retard protruding walls 43 define spaces therebetween in the circumferential direction. The spaces are in communication with the supply hole 326 and the hydraulic oil supplied from the hydraulic oil supply source 350 shown in FIG. 1 flows through the spaces. As shown in FIGS. 3 and 4, the retard protruding walls 43 respectively define inner retard ports 23. The inner retard ports 23 pass through the retard protruding walls 43 between an outer circumferential surface and an inner circumferential surface of the retard protruding walls 43. As shown in FIG. 3, the inner retard ports 23 are respectively in communication with the outer retard ports 21 defined in the outer sleeve 30. The inner retard port 23 has an axis that is offset from an axis of the outer retard port 21 in the axial direction AD.

As shown in FIG. 4, the multiple advance protruding walls 44 are disposed between the retard protruding walls 43 and the solenoid 160 in the axial direction AD. The multiple advance protruding walls 44 protrude radially outward from the tubular portion 41 and are arranged adjacent to each other in the circumferential direction. The advance protruding walls 44 define spaces therebetween in the circumferential direction. The spaces are in communication with the supply hole 326 and the hydraulic oil supplied from the hydraulic oil supply source 350 shown in FIG. 1 flows through the spaces. As shown in FIGS. 3 and 4, the advance protruding walls 44 respectively define inner advance ports 24. Each of the inner advance port 24 passes through the advance protruding wall 44 between an outer circumferential surface and an inner circumferential surface of the advance protruding wall 44. As shown in FIG. 3, the inner advance ports 24 are respectively in communication with the outer advance ports 22 defined in the outer sleeve 30. The inner advance port 24 has an axis that is offset from an axis of the outer advance port 22 in the axial direction AD.

The sealing wall 45 protrudes radially outward from an entire circumference of the tubular portion 41. The sealing wall 45 is disposed between the advance supply ports SP2 and the solenoid 160 in the axial direction AD. The sealing wall 45 seals a gap between the inner circumferential surface of the main body 31 of the outer sleeve 30 and the outer circumferential surface of the tubular portion 41 of the inner sleeve 40, thereby restricting the hydraulic oil flowing through a hydraulic oil supply passage 25, which will be described later, from leaking toward the solenoid 160. The sealing wall 45 has an outer diameter that is substantially same as that of the retard protruding walls 43 and that of the advance protruding walls 44.

The flange portion 46 protrudes radially outward from an entire circumference of the tubular portion 41 at an end portion of the inner sleeve 40 facing the solenoid 160. The flange portion 46 is arranged in the large diameter portion 36 of the outer sleeve 30. As shown in FIG. 4, the flange portion 46 includes multiple fitting portions 48. The multiple fitting portions 48 are located at an outer edge of the flange portion 46 and are arranged adjacent to each other in the circumferential direction. In the present embodiment, the fitting portions 48 are formed by cutting off an outer edge of the flange portion 46 straight. However, the fitting portions 48 may be formed by cutting off the outer edge into a curved shape. Fitting portions 48 are fit to fitting protrusions 73 of the fixing member 70 which will be described later.

As shown in FIG. 3, the stopper 49 is formed at the end portion of the inner sleeve 40 closer to the camshaft 320 in the axial direction AD. The stopper 49 has an inner diameter smaller than that of other portions of the tubular portion 41 such that the end portion of the spool 50 closer to the camshaft 320 can come into contact with the stopper 49. The stopper 49 defines a sliding limit position of the spool 50 in a direction away from the electromagnetic portion 162 of the solenoid 160.

When the outer sleeve 30 is fixed to the end portion 321 of the camshaft 320, a space between the inner sleeve 40 and the axial hole 34 defined in the outer sleeve 30 in the radial direction serves as a hydraulic oil supply passage 25 that is in communication with the hydraulic oil supply source 350. The hydraulic oil supply passage 25 is in communication with the shaft hole portion 322 of the camshaft 320 shown in FIG. 1 and guides the hydraulic oil supplied from the hydraulic oil supply source 350 to the retard supply ports SP1 and the advance supply ports SP2. The filter member 200 is arranged in the hydraulic oil supply passage 25. A description of the arrangement of the filter member 200 will be described later. As shown in FIG. 3, the outer retard ports 21 and the inner retard ports 23 form retard ports 27 that are in communication with the retard chambers 141 through the retard channels 137 shown in FIG. 2. As shown in FIG. 3, the outer advance ports 22 and the inner advance ports 24 form advance ports 28 that are in communication with the advance chambers 142 through the advance channels 138 shown in FIG. 2.

As shown in FIG. 3, at least a part in the axial direction AD between the outer sleeve 30 and the inner sleeve 40 is sealed to restrict a leak of the hydraulic oil. More specifically, the retard protruding walls 43 seal gaps between the retard ports 27 and the retard supply ports SP1 and between the retard ports 27 and the recycling ports 47. The advance protruding walls 44 seal gaps between the advance ports 28 and the advance supply ports SP2 and between the advance ports 28 and the recycling ports 47. Further, the sealing wall 45 seals a gap between the hydraulic oil supply passage 25 and an outside of the hydraulic oil control valve 10. That is, an area in the axial direction AD between the retard protruding walls 43 and the sealing wall 45 is set as a sealing area SA. Further, in the present embodiment, the main body 31 of the outer sleeve 30 has an inner diameter that is substantially constant in the sealing area SA.

The spool 50 is arranged radially inside of the inner sleeve 40. The spool 50 has an end portion in contact with the solenoid 160 and slidably moved by the solenoid 160 in the axial direction AD. The spool 50 has a spool tubular portion 51, a spool bottom portion 52, and a spring receiving portion 56. Further, the spool 50 defines an axial hole extending along the axial direction AD. The axial hole defines a part of a drain passage 53 which will be described later. Further, the spool 50 defines a drain inlet 54 and a drain outlet 55 that are in communication with the axial hole.

Figure 8:
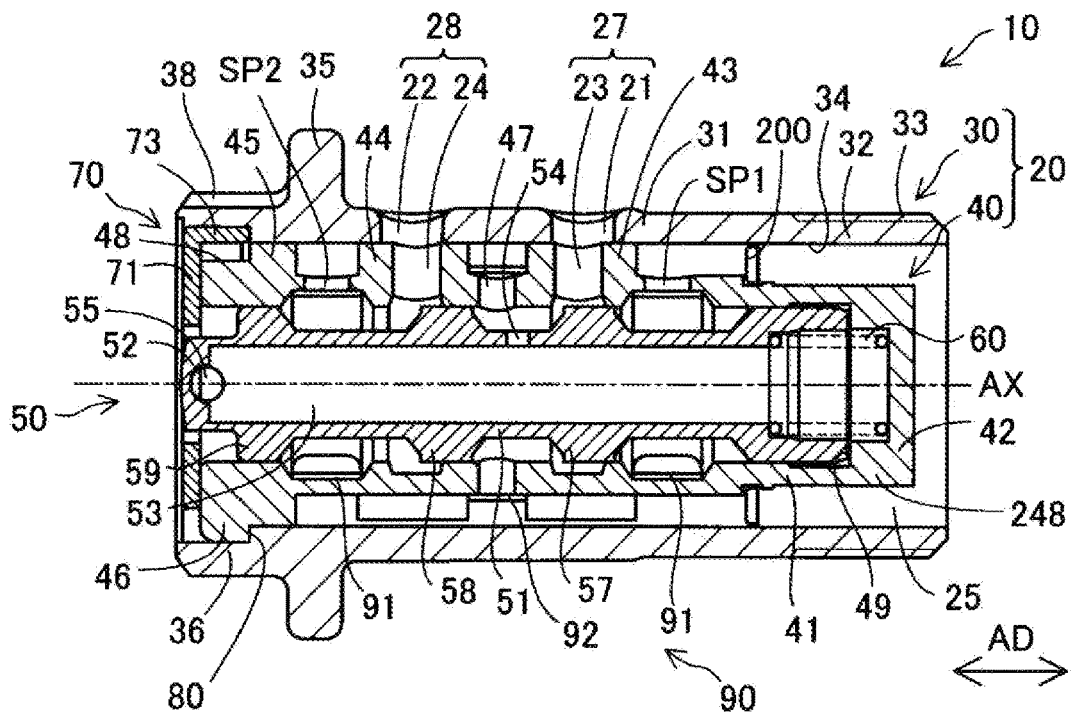
FIG. 8 is a cross-sectional view showing a state where a spool is in contact with a stopper.

The spool tubular portion 51 has a substantially tubular shape. The spool tubular portion 51 has a retard sealing portion 57, an advance sealing portion 58, and a stopper 59 on an outer circumferential surface of the spool tubular portion 51. The retard sealing portion 57, the advance sealing portion 58, and the stopper 59 are arranged in this order from the end portion of the spool 50 closer to the camshaft 320 in the axial direction AD. Each of the retard sealing portion 57, the advance sealing portion 58, and the stopper 59 protrudes radially outward entirely in the circumferential direction. As shown in FIG. 3, the retard sealing portion 57 blocks a communication between the recycling ports 47 and the retard ports 27 when the spool 50 is located at the closest position to the electromagnetic portion 162 of the solenoid 160. As shown in FIG. 8, the retard sealing portion 57 blocks a communication between the retard supply ports SP1 and the retard ports 27 when the spool 50 is located at the farthest position from the electromagnetic portion 162. As shown in FIG. 3, the advance sealing portion 58 blocks a communication between the advance supply ports SP2 and the advance ports 28 when the spool 50 is located at the closest position to the electromagnetic portion 162. As shown in FIG. 8, the advance sealing portion 58 blocks a communication between the recycling ports 47 and the advance ports 28 when the spool 50 is located at the farthest position from the electromagnetic portion 162. "Blocking a communication" is equivalent to sealing. The gap between the inner sleeve 40 and the spool 50 in the radial direction is minimized in a portion where such sealing property is required. As shown in FIG. 3, the stopper 59 defines the sliding limit of the spool 50 toward the electromagnetic portion 162 of the solenoid 160 by coming into contact with the fixing member 70.

The spool bottom portion 52 is integrally formed with the spool tubular portion 51 and closes an end portion of the spool tubular portion 51 facing the solenoid 160. The spool bottom portion 52 can protrude from the sleeve 20 toward the solenoid 160 in the axial direction AD. The spool bottom portion 52 serves as a proximal end portion of the spool 50.

A space surrounded by the spool tubular portion 51, the spool bottom portion 52, the tubular portion 41 of the inner sleeve 40, and the bottom portion 42 of the inner sleeve 40 functions as the drain passage 53. Therefore, the inside of the spool 50 functions as at least a part of the drain passage 53. The hydraulic oil discharged from the retard chambers 141 and the advance chambers 142 flows through the drain passage 53.

The drain inlet 54 is defined in the spool tubular portion 51 between the retard sealing portion 57 and the advance sealing portion 58 in the axial direction AD. The drain inlet 54 passes through the spool tubular portion 51 between the outer circumferential surface and the inner circumferential surface of the spool tubular portion 51. The drain inlet 54 guides the hydraulic oil discharged from the retard chambers 141 and the advance chambers 142 to the drain passage 53. Further, the drain inlet 54 is in communication with the supply ports SP1 and SP2 through the recycling ports 47.

The spool bottom portion 52, which is an end of the spool 50, defines the drain outlet 55 opening radially outward. The hydraulic oil in the drain passage 53 is discharged out of the hydraulic oil control valve 10 through the drain outlet 55. As shown in FIG. 1, the hydraulic oil discharged through the drain outlet 55 is collected in the oil pan 352.

As shown in FIG. 3, the spring receiving portion 56 is formed at an end portion of the spool tubular portion 51 closer to the camshaft 320 and has an inner diameter that is larger than other portion of the spool tubular portion 51. The other end of the spring 60 is in contact with the spring receiving portion 56.

In the present embodiment, each of the outer sleeve 30 and the spool 50 is made of iron and the inner sleeve 40 is made of aluminum. Materials of the outer sleeve 30, the spool 50, and the inner sleeve 40 are not limited to these materials, and may be any metal material, resin material, or the like.

The spring 60 is composed of a compression coil spring and has one end in contact with the bottom portion 42 of the inner sleeve 40 and the other end in contact with the spring receiving portion 56 of the spool 50. The spring 60 biases the spool 50 toward the solenoid 160 in the axial direction AD.

The fixing member 70 is fixed to the end portion of the outer sleeve 30 facing the solenoid 160. As shown in FIG. 4, the fixing member 70 includes a flat plate portion 71 and multiple fitting protrusions 73.

The flat plate portion 71 has a flat plate shape extending in the radial direction. Extending direction of the flat plate portion 71 is not limited to the radial direction and may be a direction intersecting the axial direction AD. The flat plate portion 71 defines an opening 72 at a center of the flat plate portion 71. As shown in FIG. 3, the spool bottom portion 52, which is one end portion of the spool 50, is inserted into the opening 72.

As shown in FIG. 4, the multiple fitting protrusions 73 protrude from the flat plate portion 71 in the axial direction AD, and are arranged side by side in the circumferential direction. Protruding direction of the fitting protrusions 73 is not limited to the axial direction AD and may be any direction intersecting the radial direction. The fitting protrusions 73 fit to the fitting portions 48 of the inner sleeve 40 respectively.

As shown in FIG. 3, the spool 50 is inserted into the inner sleeve 40 and the fixing member 70 is assembled such that the fitting protrusions 73 fit to the fitting portions 48. After that, the fixing member 70 is deformed to be fixed to the outer sleeve 30. An outer edge portion of the end surface of the fixing member 70 facing the solenoid 160 serves as deformed portions 74 that are deformed to be fixed to the outer sleeve 30.

The fixing member 70 is fixed to the outer sleeve 30 while the fitting protrusions 73 fit to the fitting portions 48. Thus, the inner sleeve 40 is restricted from rotating in the circumferential direction relative to the outer sleeve 30. Further, the fixing member 70 is fixed to the outer sleeve 30, so that the inner sleeve 40 and the spool 50 are restricted from coming off from the outer sleeve in the axial direction AD toward the solenoid 160.

The check valve 90 suppresses a backflow of the hydraulic oil. The check valve 90 includes two supply check valves 91 and a recycling check valve 92. As shown in FIG. 4, each of the supply check valves 91, and the recycling check valve 92 are formed by winding a band-shaped thin plate into an annular shape, so that each of the supply check valves 91 and the recycling check valve 92 can be elastically deformed in the radial direction. As shown in FIG. 3, each of the supply check valves 91 is arranged in contact with the inner circumferential surface of the tubular portion 41 at a position corresponding to the retard supply port SP1 or the advance supply port SP2. When each of the supply check valves 91 receives pressure of the hydraulic oil from an outside of the each of the supply check valves 91 in the radial direction, an overlapping area of the band-shaped thin plate increases and the each of the supply check valves 91 shrinks in the radial direction. The recycling check valve 92 is arranged in contact with the outer circumferential surface of the tubular portion 41 at a position corresponding to the recycling port 47. When the recycling check valve 92 receives the pressure of the hydraulic oil from an inside of the recycling check valve 92 in the radial direction, an overlapping area of the band-shaped thin plate decreases and expands in the radial direction.

Figure 5:
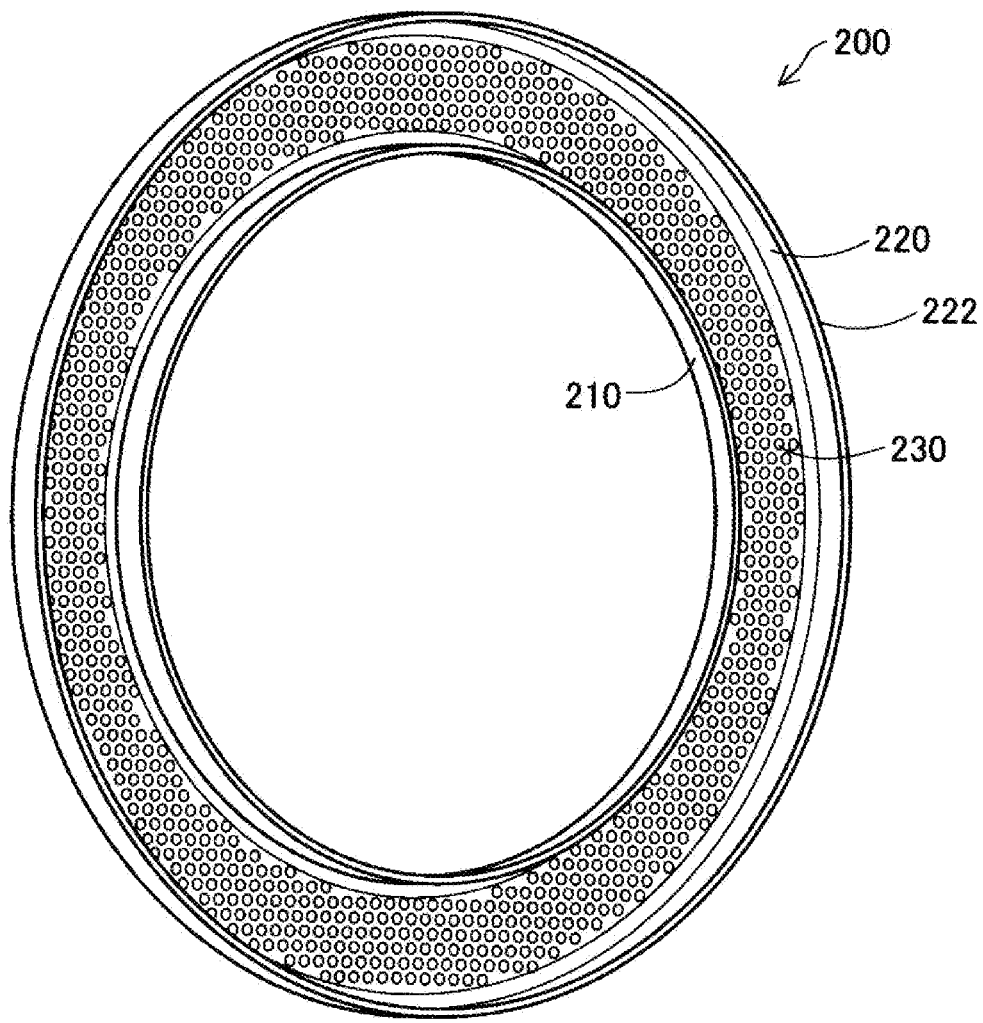
FIG. 5 is a perspective view showing a detailed configuration of a filter member.
Figure 6:
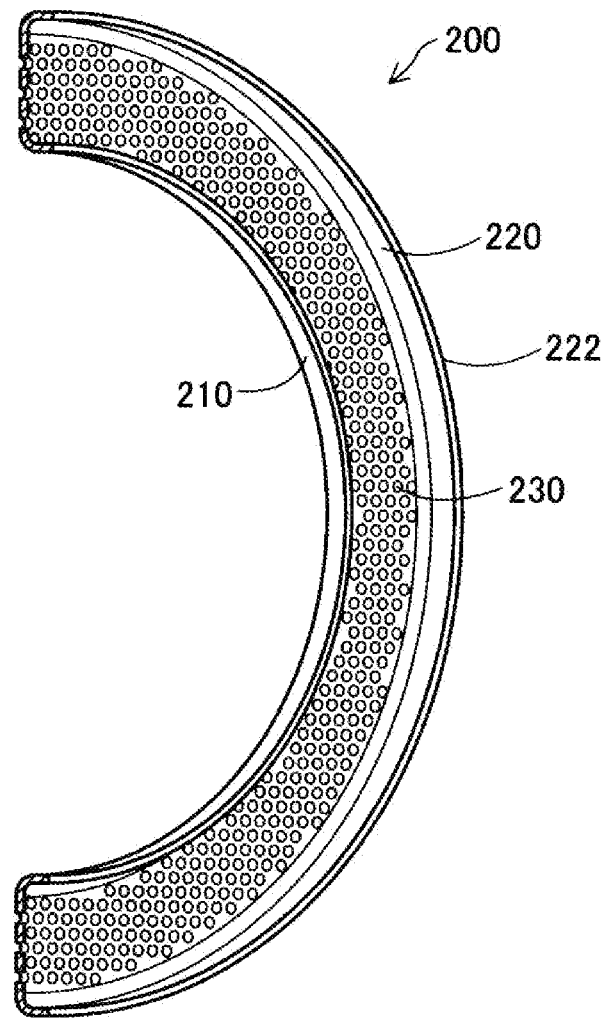
FIG. 6 is a cross-sectional perspective view showing a detailed configuration of the filter member.
Figure 7:
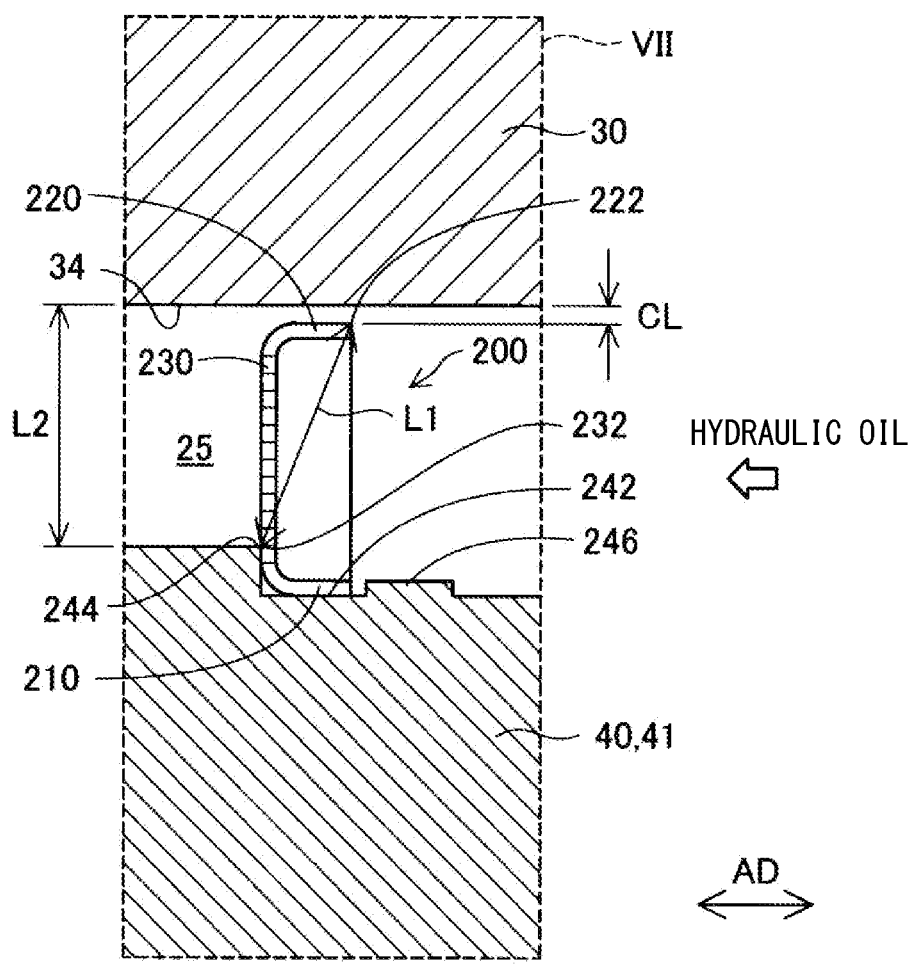
FIG. 7 is an enlarged cross-sectional view showing an area VII of FIG. 3.

The filter member 200 is arranged in the hydraulic oil supply passage 25 and configured to capture foreign matters contained in the hydraulic oil supplied from the hydraulic oil supply source 350. The filter member 200 is made of a metal and has an annular appearance as shown in FIG. 5. Further, as shown in FIGS. 6 and 7, the filter member 200 has a substantially U-shape in a cross-section taken along the radial direction. The filter member 200 includes a fixing portion 210, an outer edge portion 220, and a filtering portion 230.

As shown in FIGS. 5 to 7, the fixing portion 210 constitutes an inner circumferential surface of the filter member 200 and extends in the axial direction AD. The fixing portion 210 is fixed to the inner sleeve 40 as described later. The outer edge portion 220 constitutes an outer circumferential surface of the filter member 200 and extends in the axial direction AD. The outer edge portion 220 faces the outer sleeve 30 and is not fixed to the outer sleeve 30. The outer edge portion 220 has a filter end portion 222. The filter end portion 222 is located at a farthest position of the outer edge portion 220 from the solenoid 160, i.e., a closest position to the camshaft 320. The filtering portion 230 is connected to the fixing portion 210 and the outer edge portion 220 and extends in the radial direction. The filtering portion 230 is formed between the filter end portion 222 and the solenoid 160 in the axial direction AD. The filtering portion 230 has multiple tiny through holes and is configured to capture foreign matters contained in the hydraulic oil. In the present embodiment, the through holes are formed by etching, but may be formed by any method such as pressing.

As shown in FIG. 3, the filter member 200 is arranged in the hydraulic oil supply passage 25 to overlap with the spool 50 and the spring 60, which are internal members disposed inside the inner sleeve 40, when viewed in the radial direction. The arrangement of the filter member 200 will be described below in detail with reference to FIG. 7.

The tubular portion 41 of the inner sleeve 40 includes, on an entire circumference of the outer circumferential surface, a filter fixing portion 242, a supporting portion 244, and a filter stopper 246. The filter fixing portion 242 has an outer diameter substantially same as an inner diameter of the fixing portion 210 of the filter member 200. As a result, the fixing portion 210 is press-fit to the filter fixing portion 242. In addition, instead of press-fitting, the fixing portion 210 may be fixed to the filter fixing portion 242 with an adhesive or the like. The supporting portion 244 is disposed between the filter fixing portion 242 and the solenoid 160 in the axial direction AD. The supporting portion 244 has an outer diameter larger than that of the filter fixing portion 242. As a result, the supporting portion 244 is configured to support the filter member 200. A portion of the filter member 200 that is in contact with the supporting portion 244 and supported by the supporting portion 244 is referred to as a supported portion 232. In the present embodiment, the supported portion 232 is located at the filtering portion 230.

The filter stopper 246 is disposed between the filter fixing portion 242 and the camshaft 320 in the axial direction AD. The filter stopper 246 has an outer diameter slightly larger than the outer diameter of the filter fixing portion 242. The supporting portion 244 and the filter stopper 246 defines a position of the filter member 200 in the axial direction AD.

As shown in FIG. 3, a space serving as the hydraulic oil supply passage 25 entirely extends in a circumferential direction at a position where the filter member 200 is disposed. The annular filter member 200 is inserted into the space from the inner sleeve end portion 248 and assembled. Thus, the inner sleeve end portion 248 has an outer diameter less than the inner diameter of the fixing portion 210 of the filter member 200.

As shown in FIG. 7, there is a clearance CL between the outer sleeve 30 and the outer edge portion 220 in the radial direction. The clearance CL is formed to be smaller than the size of foreign matters to be captured contained in the hydraulic oil. In other words, the size of the clearance CL is smaller than the size of the multiple tiny through holes formed in the filtering portion 230, which is the mesh size (hole diameter) of the filter member 200. Further, in a cross-section of the hydraulic oil control valve taken along the axial direction AD, a linear length L1 between the filter end portion 222 and the supported portion 232 is larger than a radial length L2 between the outer sleeve 30 and the supporting portion 244 in the radial direction.

As shown by a white arrow in FIG. 7, the hydraulic oil in the hydraulic oil supply passage 25 flows a side closer to the camshaft 320 toward the solenoid 160 in the axial direction AD. The filter member 200 may be deformed by a pressure of the supplied hydraulic oil. More specifically, the filter member 200 may be deformed such that the outer edge portion 220 is deformed to a downstream side of the outer edge portion 220 in a flow of the supplied hydraulic oil, i.e., toward the solenoid 160 in the axial direction AD, with respect to the supporting portion 244 as a fulcrum. However, since the linear length L1 between the filter end portion 222 and the supported portion 232 is larger than the radial length L2 between the outer sleeve 30 and the supporting portion 244, when the outer edge portion 220 of the filter member 200 is distorted to the downstream side in the flow of the supplied hydraulic oil, the filter end portion 222 comes into contact with the axial hole 34. Therefore, it is possible to restrict the clearance CL between the axial hole 34 of the outer sleeve 30 and the outer edge portion 220 in the radial direction from increasing, so that foreign matters are restricted from passing through the clearance CL. Therefore, it is possible to prevent the performance of the filter member 200 from deteriorating.

In the present embodiment, the crankshaft 310 is a subordinate concept of the drive shaft in the present disclosure, the camshaft 320 is a subordinate concept of the driven shaft in the present disclosure, and the intake valve 330 is a subordinate concept of the valve in the present disclosure. Further, the solenoid 160 corresponds to a subordinate concept of the actuator in the present disclosure. Further, each of the spool 50 and the spring 60 correspond to a subordinate concept of an internal member arranged inside the inner sleeve in the present disclosure, the inner sleeve 40 corresponds to a subordinate concept of a first sleeve in the present disclosure, and the outer sleeve 30 corresponds to a subordinate concept of a second sleeve in the present disclosure.

A-2. Operation of Valve Timing Adjustment Device:

As shown in FIG. 1, the hydraulic oil supplied from the hydraulic oil supply source 350 to the supply inlet 326 flows into the hydraulic oil supply passage 25 through the shaft hole portion 322. When the solenoid 160 is not energized and the spool 50 is located at the closest position to the electromagnetic portion 162 of the solenoid 160 as shown in FIG. 3, the retard ports 27 are in communication with the retard supply ports SP1. As a result, the hydraulic oil in the hydraulic oil supply passage 25 is supplied into the retard chambers 141, the vane rotor 130 rotates in the retard direction relative to the housing 120, and a relative rotation phase of the camshaft 320 with respect to the crankshaft 310 is shifted in the retard direction. Further, in this state, the advance ports 28 are not in communication with the advance supply ports SP2 but in communication with the recycling ports 47. As a result, the hydraulic oil discharged from the advance chambers 142 is returned to the retard supply ports SP1 through the recycling ports 47 and recirculated. Further, a part of the hydraulic oil discharged from the advance chambers 142 flows into the drain passage 53 through the drain inlet 54, and is returned to the oil pan 352 through the drain outlet 55.

When the solenoid 160 is energized and the spool 50 is located at the farthest position from the electromagnetic portion 162 of the solenoid 160 as shown in FIG. 8, i.e., when the spool 50 is in contact with the stopper 49, the advance ports 28 are in communication with the advance supply ports SP2. As a result, the hydraulic oil in the hydraulic oil supply passage 25 is supplied into the advance chambers 142, the vane rotor 130 rotates in the advance direction relative to the housing 120, and the relative rotation phase of the camshaft 320 with respect to the crankshaft 310 is shifted in the advance direction. Further, in this state, the retard ports 27 are not in communication with the retard supply ports SP1 but in communication with the recycling ports 47. As a result, the hydraulic oil discharged from the retard chambers 141 is returned to the advance supply ports SP2 through the recycling ports 47 and recirculated. Further, a part of the hydraulic oil discharged from the retard chambers 141 flows into the drain passage 53 through the drain inlet 54, and is returned to the oil pan 352 through the drain outlet 55.

Figure 9:
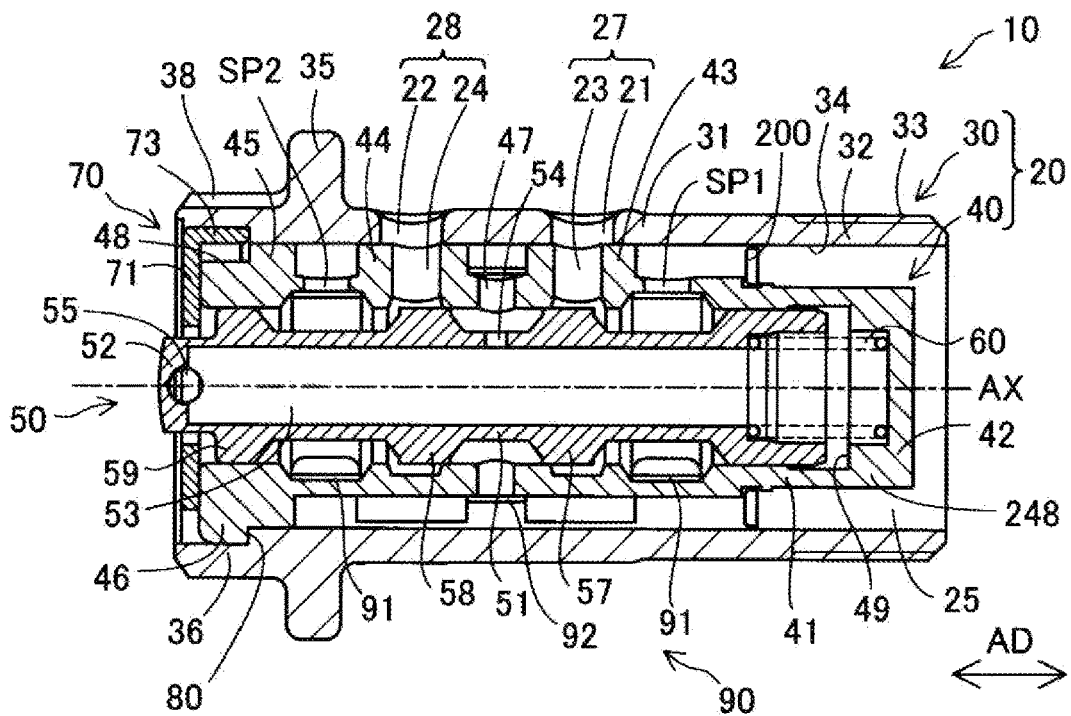
FIG. 9 is a cross-sectional view showing a state where the spool is located substantially at a center in a sliding area.

Further, as shown in FIG. 9, when the solenoid 160 is energized and the spool 50 is located substantially in the center of the sliding area, the retard ports 27 are in communication with the retard supply ports SP1 and the advance ports 28 are in communication with the advance supply ports SP2. As a result, the hydraulic oil in the hydraulic oil supply passage 25 is supplied to both the retard chambers 141 and the advance chambers 142, the vane rotor 130 is restricted from rotating relative to the housing 120, and the relative rotation phase of the camshaft 320 with respect to the crankshaft 310 is maintained.

In this way, the spool 50 slides in the axial direction AD by energizing the solenoid 160. The sliding area 520 of the spool 50 is set as an area between a position where the spool 50 is in contact with the fixing member 70 and a position where the spool 50 is in contact with the stopper 49.

The hydraulic oil supplied to the retard chambers 141 or the advance chambers 142 flows into the housing hole 132 through the retard chamber pin control oil channel 133 or the advance chamber pin control oil channel 134. Therefore, when sufficient hydraulic pressure is applied to the retard chambers 141 or the advance chambers 142, the lock pin 150 comes off from the fitting recessed portion 128 against the biasing force of the spring 151 by the hydraulic oil flowing into the housing hole 132. As a result, the vane rotor 130 is allowed to rotate relative to the housing 120.

When the relative rotation phase of the camshaft 320 is advanced from the target phase, the valve timing adjustment device 100 sets an energizing amount to the solenoid 160 to a relatively small value and rotates the vane rotor 130 in the retard direction relative to the housing 120. As a result, the relative rotation phase of the camshaft 320 with respect to the crankshaft 310 is shifted in the retard direction and the valve timing is retarded. Further, when the relative rotation phase of the camshaft 320 is retarded from the target value, the valve timing adjustment device 100 sets the energization amount to the solenoid 160 to a relatively large value and rotates the vane rotor 130 in the advance direction relative to the housing 120. As a result, the relative rotation phase of the camshaft 320 with respect to the crankshaft 310 is shifted in the advance direction and the valve timing is advanced. Further, when the relative rotation phase of the camshaft 320 matches the target phase, the valve timing adjustment device 100 sets the energization amount to the solenoid 160 to a medium value and restricts the vane rotor 130 from rotating relative to the housing 120. As a result, the relative rotation phase of the camshaft 320 with respect to the crankshaft 310 is maintained and the valve timing is maintained.

According to the hydraulic oil control valve 10 of the valve timing adjustment device 100 of the first embodiment described above, the filter member 200 is arranged in the hydraulic oil supply passage 25 to overlap with the spool and the spring as the internal members disposed inside of the inner sleeve 40 in the radial direction. Therefore, it is possible to suppress an increase in a dimension of the inner sleeve 40 in the axial direction to dispose the filter member 200.

Further, since it is possible to suppress the increase in the dimension of the inner sleeve 40 in the axial direction AD, it is possible to suppress an increase in a dimension of the outer sleeve 30 in the axial direction AD. Thus, a degree of freedom in design of a portion of the outer sleeve 30 closer to the camshaft 320, i.e., the valve fixing portion 32, can be restricted from decreasing. Therefore, the length of the outer sleeve 30 and the shape of the valve fixing portion 32 can be changed without affecting other parts. Further, when changing a configuration of a portion of the outer sleeve 30 located between the camshaft 320 and a mounting position of the filter member 200 in the axial direction AD, a change in the mounting position of the filter member 200 is not required. Thus, it is possible to suppress an increase in a manufacturing cost of the hydraulic oil control valve 10.

Further, since the space serving as the hydraulic oil supply passage 25 entirely extends in a circumferential direction at a position where the filter member 200 is to be disposed, the annular filter member 200 can be disposed. Therefore, it is possible to restrict the configuration of the filter member 200 from becoming complicated and it is possible to suppress an increase in the cost required for manufacturing the filter member 200.

Further, since the outer diameter of the inner sleeve end portion 248 is smaller than the inner diameter of the fixing portion 210 of the filter member 200, the filter member 200 can be inserted and assembled from the inner sleeve end portion 248. Therefore, it is possible to restrict the configurations of the filter member 200 and the inner sleeve 40 from becoming complicated for assembly, to simplify the assembly process, and to suppress an increase in the cost required for manufacturing the filter member 200 and the inner sleeve 40.

Further, the fixing portion 210 of the filter member 200 is fixed to the filter fixing portion 242 of the inner sleeve 40 and the outer edge portion 220 of the filter member 200 is not fixed to the axial hole 34 of the outer sleeve 30. Therefore, the radial clearance CL can be defined between the outer sleeve 30 and the outer edge portion 220, and the clearance CL can absorb an axial misalignment between the outer sleeve 30 and the inner sleeve 40. Therefore, a dimensional accuracy of the filter member 200 can be relaxed, and it is possible to suppress an increase in the cost required for manufacturing the filter member 200. Further, since the size of the clearance CL is smaller than the size of multiple small through holes defined in the filtering portion 230 of the filter member 200, it is possible to suppress a deterioration of the foreign matter filtering performance of the filter member 200.

Further, the supporting portion 244 is formed on the outer circumferential surface of the inner sleeve 40 and the filter member 200 is fixed to the inner sleeve 40. Therefore, as compared with the configuration in which the supporting portion is formed on the inner circumferential surface of the outer sleeve 30 and the filter member 200 is fixed to the inner circumferential surface of the outer sleeve 30, the supporting portion 244 can be easily formed on the outer circumferential surface of the inner sleeve 40. Further, since the filter member 200 is press-fit to the inner sleeve 40, the assembly process is more simple compared to a configuration that they are fixed with an adhesive or the like.

Further, since the linear length L1 between the filter end portion 222 and the supported portion 232 is larger than the radial length L2 between the outer sleeve 30 and the supporting portion 244, when the filter member 200 is distorted due to a pressure of the hydraulic oil, the filter end portion 222 comes in contact with the axial hole 34. Therefore, it is possible to restrict the clearance CL between the axial hole 34 of the outer sleeve 30 and the outer edge portion 220 from increasing, so that foreign matters are restricted from passing through the clearance CL. Therefore, it is possible to prevent the performance of the filter member 200 from deteriorating.

Further, since the sleeve 20 has a double-structure including the outer sleeve 30 and the inner sleeve 40, the hydraulic oil supply passage 25 can be easily defined by a space between the outer sleeve 30 and the inner sleeve 40 in the radial direction. Therefore, it is possible to restrict the hydraulic pressure from being applied to the spool 50 when supplying the hydraulic oil and to suppress deterioration of the slidability of the spool 50. Further, a complicated configuration such as a structure for fluidly connecting between the ports SP1, SP2, 23, 24, 47, the retard supply port SP1, and the advance supply port SP2 can be easily formed on the inner sleeve 40. Therefore, the workability of the sleeve 20 can be improved and the manufacturing process of the sleeve 20 can be restricted from becoming complicated. Further, since the workability can be improved, the degree of freedom in designing each port SP1, SP2, 27, 28, 47, and the like can be improved, and the mountability of the hydraulic oil control valve 10 and the valve timing adjustment device 100 can be improved.

B. Second Embodiment

Figure 10:
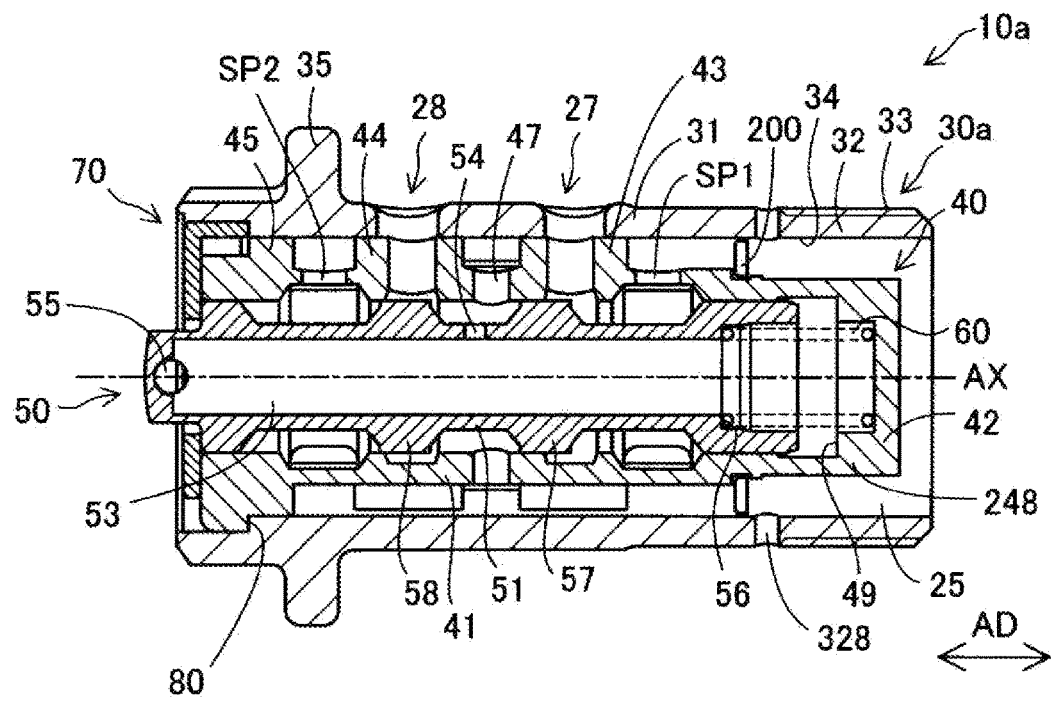
FIG. 10 is a cross-sectional view showing a schematic configuration of a hydraulic oil control valve of a second embodiment.

A hydraulic oil control valve 10a of a second embodiment shown in FIG. 10 is different from the hydraulic oil control valve 10 of the first embodiment in that an outer sleeve 30a is provided instead of the outer sleeve 30. Since the other configurations are the same as those in the first embodiment, the same configurations are designated by the same reference numerals, and detailed description thereof will be omitted.

The outer sleeve 30a of the hydraulic oil control valve 10a of the second embodiment includes multiple supply holes 328 between a position where the filter member 200 is disposed and the camshaft 320 in the axial direction AD. The multiple supply holes 328 are arranged adjacent to each other in the circumferential direction and pass through the main body 31 between the outer circumferential surface of the main body 31 and the axial hole 34. Hydraulic oil is supplied into the supply holes 328 from the hydraulic oil supply source 350 shown in FIG. 1.

According to the hydraulic oil control valve 10a of the second embodiment described above, effects similar to those of the hydraulic oil control valve 10 of the first embodiment are obtained.

C. Third Embodiment

Figure 11:
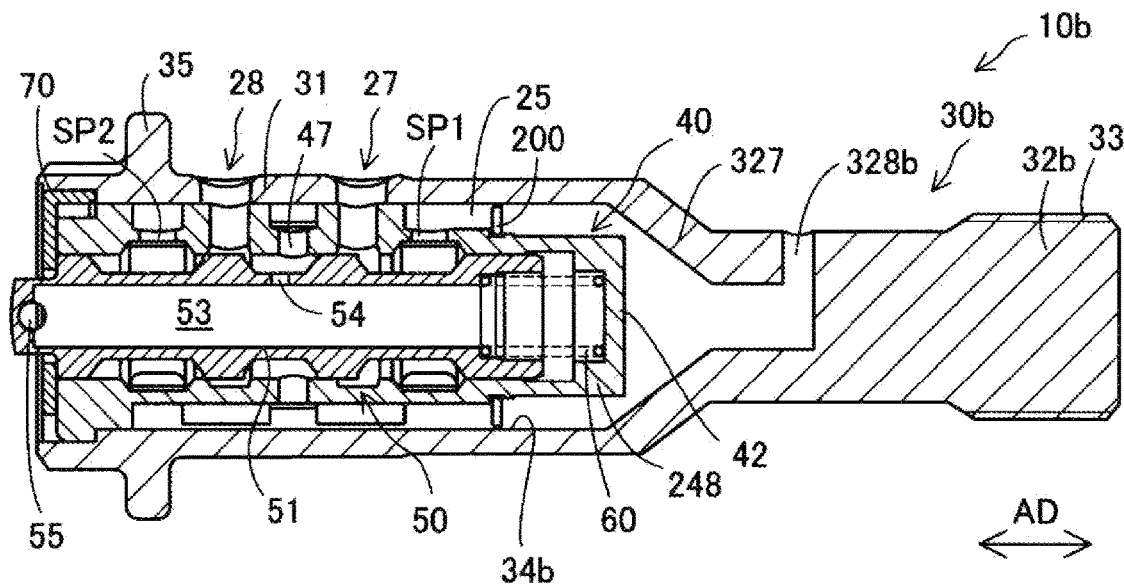
FIG. 11 is a cross-sectional view showing a schematic configuration of a hydraulic oil control valve of a third embodiment.

A hydraulic oil control valve 10b of a third embodiment shown in FIG. 11 is different from the hydraulic oil control valve 10 of the first embodiment in that an outer sleeve 30b is provided instead of the outer sleeve 30. Since the other configurations are the same as those in the first embodiment, the same configurations are designated by the same reference numerals, and detailed description thereof will be omitted.

The outer sleeve 30b of the hydraulic oil control valve 10b of the third embodiment has a valve fixing portion 32b in place of the valve fixing portion 32 and a small diameter portion 327 connected between the main body 31 and the valve fixing portion 32b in the axial direction AD.

The valve fixing portion 32b has a dimension in the axial direction AD that is larger than that of the valve fixing portion 32 of the first embodiment. The valve fixing portion 32b has an outer diameter less than that of the main body 31. The valve fixing portion 32b defines a supply hole 328b. The supply hole 328b fluidly connects between the outer circumferential surface of the valve fixing portion 32b and the axial hole 34b. Hydraulic oil is supplied into the supply hole 328b from the hydraulic oil supply source 350 shown in FIG. 1. The small diameter portion 327 has an inner diameter less than that of the main body 31. More specifically, the inner diameter of the small diameter portion 327 gradually decreases from a portion of the small diameter portion 327 closer to the solenoid 160 toward the camshaft 320.

According to the hydraulic oil control valve 10b of the third embodiment described above, effects similar to those of the hydraulic oil control valve 10 of the first embodiment can be obtained.

D. Fourth Embodiment

Figure 12:
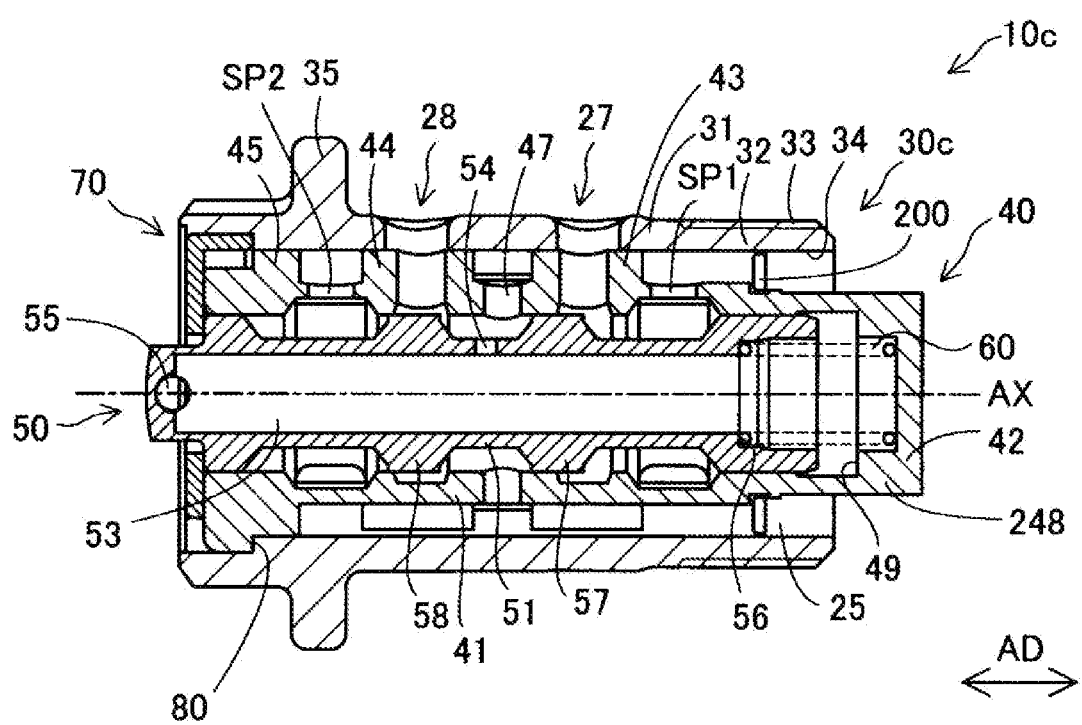
FIG. 12 is a cross-sectional view showing a schematic configuration of a hydraulic oil control valve of a fourth embodiment.

A hydraulic oil control valve 10c of a fourth embodiment shown in FIG. 12 is different from the hydraulic oil control valve 10 of the first embodiment in that an outer sleeve 30c is provided instead of the outer sleeve 30. Since the other configurations are the same as those in the first embodiment, the same configurations are designated by the same reference numerals, and detailed description thereof will be omitted.

The outer sleeve 30c of the hydraulic oil control valve 10c of the fourth embodiment has a dimension in the axial direction AD less than that of the outer sleeve 30 of the first embodiment. Therefore, the inner sleeve end portion 248 extends toward the camshaft 320 beyond the outer sleeve 30c in the axial direction AD.

According to the hydraulic oil control valve 10c of the fourth embodiment described above, effects similar to those of the hydraulic oil control valve 10 of the first embodiment can be obtained. In addition, since the inner sleeve end portion 248 extends toward the camshaft 320 beyond the outer sleeve 30c in the axial direction AD, it is possible to suppress an increase in the size of the outer sleeve 30 in the axial direction AD. Therefore, it is possible to suppress an increase in a dimension of the shaft hole portion 322 in the axial direction AD that is defined in the end portion 321 of the camshaft 320, i.e., a dimension in the axial direction of the shaft hole portion 322 forming the shaft fixing portion 323 to fix the hydraulic oil control valve 10. Therefore, it is possible to suppress an increase in the length of the camshaft 320 and it is possible to suppress an increase in the dimension in the axial AD of the internal combustion engine 300 including the solenoid 160 and the camshaft 320. Further, since it is possible to suppress an increase in the size of the outer sleeve 30 in the axial direction AD, it is possible to improve the mountability of the hydraulic oil control valve 10 and the valve timing adjustment device 100.

E. Fifth Embodiment

Figure 13:
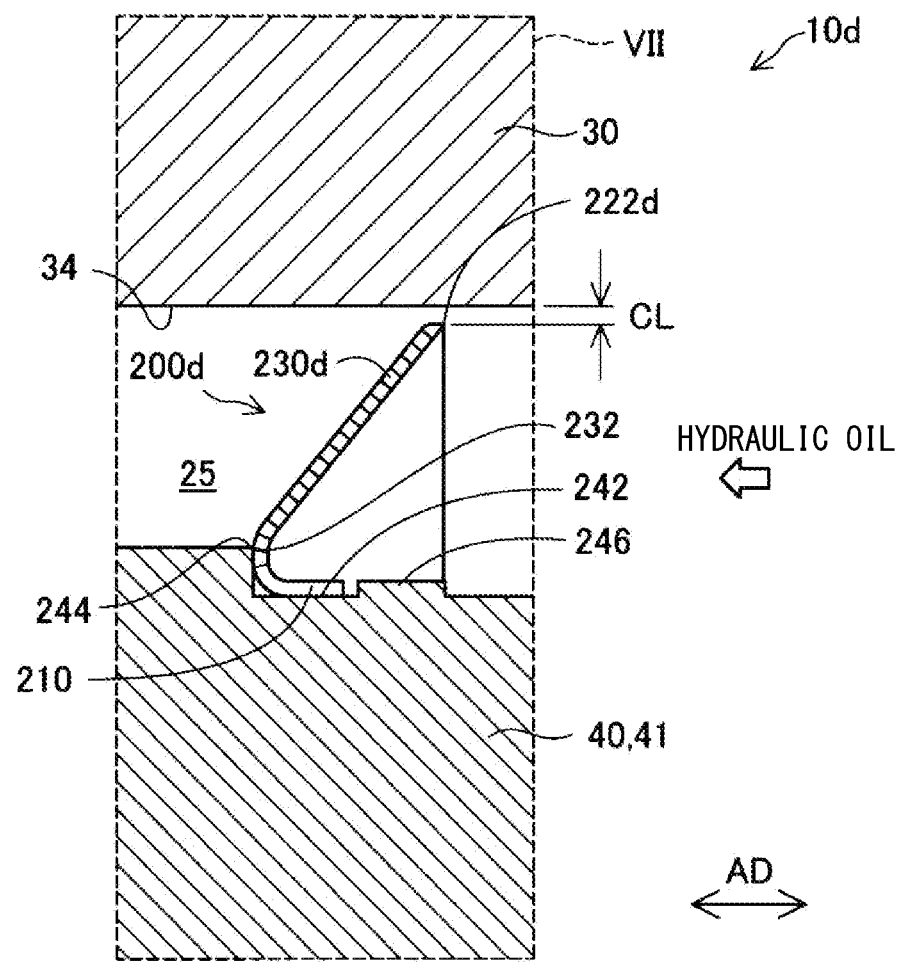
FIG. 13 is a cross-sectional view illustrating a filter member of a fifth embodiment.

A hydraulic oil control valve 10g of a fifth embodiment shown in FIG. 13 is different from the hydraulic oil control valve 10 of the first embodiment in that a filter member 200d is provided instead of the filter member 200. Since the other configurations are the same as those in the first embodiment, the same configurations are designated by the same reference numerals, and detailed description thereof will be omitted. Note that FIG. 13 shows a cross-section of the same area as in FIG. 7 taken along the radial direction.

The filter member 200d of the hydraulic oil control valve 10d of the fifth embodiment has an annular appearance shape and has a substantially V-shape in a cross-section along the radial direction. The filter member 200d has the fixing portion 210 and the filtering portion 230d. The filtering portion 230d is connected to the fixing portion 210 and extends in a direction intersecting the axial direction AD. The filtering portion 230d is positioned closer to the solenoid 160 in the axial direction AD as approaching toward an inner side of the filtering portion 230d in the radial direction. The filtering portion 230d includes a filter end portion 222d. The filter end portion 222d constitutes an outer edge of the filtering portion 230d and is located at a farthest position of the filtering portion 230d from the solenoid 160 in the axial direction AD, i.e., a closest position to the camshaft 320. The filter end portion 222d faces the outer sleeve 30.

According to the hydraulic oil control valve 10d of the fifth embodiment described above, effects similar to those of the hydraulic oil control valve 10 of the first embodiment can be obtained. In addition, since the filter member 200d has a substantially V-shape in the cross-section along the radial direction, an area of the filtering portion 230d can be increased. Therefore, it is possible to suppress a pressure loss of the hydraulic oil flowing through the hydraulic oil supply passage 25 and the filtering portion 230d.

F. Sixth Embodiment

Figure 14:
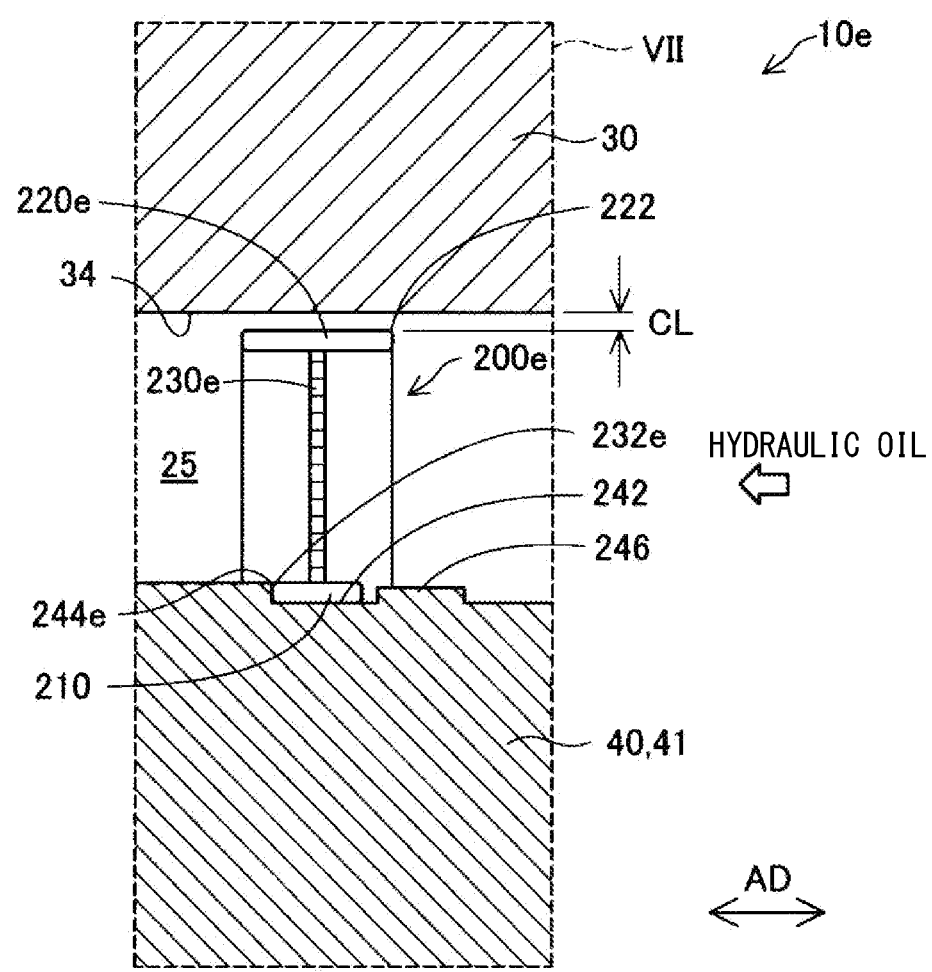
FIG. 14 is a cross-sectional view illustrating a filter member of a sixth embodiment.

A hydraulic oil control valve 10e of a sixth embodiment shown in FIG. 14 is different from the hydraulic oil control valve 10 of the first embodiment in that a filter member 200e is provided instead of the filter member 200. Since the other configurations are the same as those in the first embodiment, the same configurations are designated by the same reference numerals, and detailed description thereof will be omitted. Note that FIG. 14 shows a cross-section of the same area as in FIG. 12 taken along the radial direction.

The filter member 200e of the hydraulic oil control valve 10e of the sixth embodiment has an annular appearance shape and has a substantially I-shape in a cross-section along the radial direction. The filter member 200 includes a fixing portion 210, an outer edge portion 220e, and a filtering portion 230e. The outer edge portion 220e has a dimension in the axial direction AD larger than that of the fixing portion 210. The filtering portion 230e is connected to a substantially central portion of the fixing portion 210 and a substantially central portion of the outer edge portion 220e in the axial direction AD, and extends in the radial direction.

In the present embodiment, the supporting portion 244e has an outer diameter that is slightly less than the outer diameter of the supporting portion 244 of the first embodiment. Further, the supported portion 232e of the filter member 200e is located at an end portion of the fixing portion 210 closer to the solenoid 160 in the axial direction AD.

According to the hydraulic oil control valve 10e of the sixth embodiment described above, effects similar to those of the hydraulic oil control valve 10 of the first embodiment can be obtained.

G. Other Embodiments (1) In each of the above embodiments, the filter members 200, 200d, and 200e are arranged at positions in the hydraulic oil supply passage 25 overlapping with the spool 50 and the spring 60 in the radial direction, but may be arranged at a position overlapping only with the spool 50 or only with the spring 60. Further, for example, the filter members 200, 200d, and 200e may be arranged at a position overlapping in the radial direction with the supply check valve 91 that is disposed inside of the inner sleeve 40. That is, in general, the filter members 200, 200d, 200e may be arranged in the radial space between the inner sleeve 40 and the axial holes 34, 34b of the outer sleeve 30, 30a to 30c at a position overlapping in the radial direction with at least one of the internal members disposed inside the inner sleeve 40. Even with such a configuration, the same effects as those of each of the above described embodiments can be obtained.

(2) The configurations of the filter members 200, 200d, and 200e in each of the above embodiments are merely examples and can be variously changed. For example, depending on the shape of the hydraulic oil supply passage 25, the filter member 200, 200d, and 200e may have a C-shaped appearance instead of the annular shape. In such an embodiment, the radial space between the inner sleeve 40 and the axial holes 34 and 34b of the outer sleeves 30, 30a to 30c may not be entirely formed in the circumferential direction, and a part of the radial space in the circumferential direction may be closed. Further, for example, two filter members formed in a semi-annular shape may be assembled to the outer circumferential surface of the inner sleeve 40 and then connected to each other. In such an embodiment, the outer diameter of the inner sleeve end portion 248 may be larger than the inner diameter of the filter members 200, 200d, and 200e. Further, for example, the filter members 200, 200d, and 200e may be made of any material such as a resin material as well as a metal material, or may be formed of an elastic material. According to this embodiment, even if the filter member 200, 200d, 200e is fixed to both the outer circumferential surface of the inner sleeve 40 and the inner circumferential surface of the outer sleeve 30, 30a to 30c, an axial misalignment between the inner sleeve 40 and the outer sleeve 30, 30a to 30c can be absorbed. Further, for example, the fixing portion 210 may be omitted. Such a configuration also achieves the same effects as those of the embodiment described above.

(3) In each of the above embodiments, the filter member 200, 200d, 200e is fixed to the outer circumferential surface of the inner sleeve 40. However, the filter member 200, 200d, 200e may be fixed to the inner circumferential surface of the outer sleeve 30, 30a to 30c in addition to or in place of the inner sleeve 40. In such an embodiment, the outer edge portion 220, 220e serves as a fixing portion fixed to the filter fixing portion of the outer sleeve 30, 30a to 30c serving as the first sleeve. Further, the radial clearance CL between the outer sleeve 30, 30a to 30c and the outer edge portion 220, 220e may be omitted, and a radial clearance CL may be defined between the inner sleeve 40 serving as the second sleeve and the fixing portion 210. Such a configuration also achieves the same effects as those of the embodiment described above.

(4) In each of the above embodiments, the linear length L1 between the filter end portion 222 and the supported portion 232, 232e is larger than the radial length L2 between the outer sleeve 30, 30a to 30c and the supporting portion 244, 244e. However, the linear length L1 may be less than or equal to the radial length L2. Further, in each of the above embodiments, the inner sleeve 40 to which the filter member 200, 200d, 200e is fixed includes the supporting portion 244, 244e and the stopper 246. However, at least one of the supporting portion 244, 244e and the stopper 246 may be omitted. Such a configuration also achieves the same effects as those of the embodiment described above.

(5) The configurations of the hydraulic oil control valves 10, 10a to 10e in the above embodiments are merely examples and can be variously changed. For example, the recycling mechanism with the recycling ports 47 may be omitted. Further, fixing method to the end portion 321 of the camshaft 320 is not limited to fastening between the male thread portion 33 and the female thread portion 324. The fixing to the end portion 321 of the camshaft 320 may be realized by any method such as welding. Further, the present disclosure is not limited to the solenoid 160 and any actuators such as an electric motor and an air cylinder may drive the hydraulic control valve. Such a configuration also achieves the same effects as those of the embodiment described above.

(6) In each of the above embodiments, the valve timing adjustment device 100 adjusts the valve timing of the intake valve 330 that is opened and closed by the camshaft 320, but the valve timing adjustment device 100 may adjust the valve timing of the exhaust valve 340. Further, the valve timing adjustment device 100 may be fixed to the end portion 321 of the camshaft 320 as a driven shaft to which a driving force is transmitted from the crankshaft 310 as the drive shaft through an intermediate shaft, or may be fixed to one of the end of the drive shaft and the end of the driven shaft of the camshaft having the double structure.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they may be omitted as appropriate.

What is claimed is:

1. A hydraulic oil control valve for a valve timing adjustment device, the valve timing adjustment device being configured to adjust valve timing of a valve and fixed to an end portion of one shaft that is a drive shaft or a driven shaft, the driven shaft being configured to selectively open and close the valve with a driving force transmitted from the drive shaft, the hydraulic oil control valve being coaxially disposed with a rotational axis of the valve timing adjustment device and configured to control a flow of a hydraulic oil supplied from a hydraulic oil supply source, the hydraulic oil control valve comprising:
a tubular sleeve;
a spool that has an end portion in contact with an actuator and that is slidably moved by the actuator in an axial direction within the sleeve; and
a filter member configured to capture foreign matters contained in the hydraulic oil, wherein
the sleeve includes:
an inner sleeve disposed radially outside of the spool, internal members being disposed in the inner sleeve and the internal members including at least one of the spool or a spring that is configured to bias the spool toward the actuator in the axial direction; and
an outer sleeve defining therein an axial hole extending in the axial direction, the inner sleeve being inserted into the axial hole,
the outer sleeve has an outer circumferential surface defining a thread portion engageable with a thread portion of the one shaft,
the outer sleeve is configured to be fixed to the end portion of the one shaft through engagement between the thread poriton of the outer sleeve and the thread poriton of the one shaft by an axial force applied to the outer sleeve in the axial direction,
a space between the axial hole and the inner sleeve in a radial direction serves as a hydraulic oil supply passage, fluid communication between the hydraulic oil supply passage and the hydraulic oil supply source being established when the outer sleeve is fixed to the end portion of the one shaft, and
the filter member is disposed between the axial hole of the outer sleeve and the inner sleeve in the radial direction to overlap with at least one of the internal members in the inner sleeve when viewed in the radial direction.

2. The hydraulic oil control valve according to claim 1, wherein
the internal members include the spool and the spring that is configured to bias the spool toward the actuator in the axial direction.

3. The hydraulic oil control valve according to claim 1, wherein
at least a portion of the space in the axial direction entirely extends in a circumferential direction.

4. The hydraulic oil control valve according to claim 1, wherein
the filter member has an annular shape,
the inner sleeve has an inner sleeve end portion that is an end of the inner sleeve in the axial direction away from the actuator, and
the inner sleeve end portion has an outer diameter that is less than an inner diameter of the filter member.

5. The hydraulic oil control valve according to claim 1, wherein
one of the outer sleeve and the inner sleeve is defined as a first sleeve, and
the filter member is fixed to the first sleeve.

6. The hydraulic oil control valve according to claim 5, wherein
the first sleeve includes a supporting portion configured to support the filter member,
the filter member has an annular shape,
the filter member includes;
a fixing portion extending in the axial direction and fixed to the first sleeve;
a filtering portion connected to the fixing portion and extending in a direction intersecting the axial direction, the filtering portion being configured to capture the foreign matters;
a filter end portion facing a second sleeve that is another of the outer sleeve and the inner sleeve, the filter end portion being located at a position in the filter member farthest from the actuator in the axial direction; and
a supported portion supported by the supporting portion, wherein
a linear length between the filter end portion and the supported portion in a cross-section of the hydraulic oil control valve that is taken along the axial direction is greater than a radial length between the second sleeve and the supporting portion in the radial direction.

7. The hydraulic oil control valve according to claim 5, wherein
the inner sleeve has an inner sleeve end portion that is away from the actuator,
the inner sleeve end portion is apart from an inner surface of the outer sleeve entirely in a circumferential direction to define the space therebetween, and
the filter extends entirely in the circumferential direction within the space.

8. The hydraulic oil control valve according to claim 5, wherein
the first sleeve defines a recess,
the filter member has an annular shape,
the filter member includes;
a fixing portion extending in the axial direction and disposed in the recess;
a filtering portion connected to the fixing portion and extending in a direction intersecting the axial direction, the filtering portion being configured to capture foreign matters;
a filter end portion located away from the recess and located at a position in the filter member farthest from the actuator in the axial direction; and
a supported portion in contact with a corner of the recess, wherein
a linear length between the filter end portion and the supported portion in a cross-section of the hydraulic oil control valve that is taken along the axial direction is greater than a radial length between a second sleeve that is the other of the outer sleeve and the inner sleeve and the corner of the recess.

9. A valve timing adjustment device comprising the hydraulic oil control valve according to claim 1.

10. The hydraulic oil control valve according to claim 1, wherein
the filter member includes a filtering portion defining a plurality of tiny holes to capture foreign matters,
the filtering portion entirely extends in a circumferential direction.

11. The hydraulic oil control valve according to claim 1, wherein
the filter member includes:
a first arm extending in the axial direction;
a second arm extending in the axial direction; and
a filtering portion connecting between the first arm and the second arm and extending in a direction intersecting the axial direction.

12. The hydraulic oil control valve according to claim 11, wherein
one of the outer sleeve and the inner sleeve defines a recess,
the first arm is disposed in the recess,
the filtering portion has a contact point that is in contact with a corner of the recess, and
a distance between an end of the second arm away from the actuator and the contact point is greater than a distance between the other of the inner sleeve and the outer sleeve and the contact point.

13. The hydraulic oil control valve according to claim 1, wherein
the hydraulic oil control valve is configured to drive a phase shifting portion that shifts a phase of the driven shaft relative to the drive shaft by controlling the flow of the hydraulic oil supplied from the hydraulic oil supply source.

* * * * *